United States Patent
Ng et al.

(10) Patent No.: US 12,411,206 B2
(45) Date of Patent: Sep. 9, 2025

(54) UTILIZATION OF WIRELESS COMMUNICATION REFERENCE SIGNAL MEASUREMENT RESOURCES FOR CO-CHANNEL RADAR OPERATION

(71) Applicant: Samsung Electronics Co., Ltd., Suwon-si (KR)

(72) Inventors: Boon Loong Ng, Plano, TX (US); Vutha Va, Plano, TX (US); Jianhua Mo, Allen, TX (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 600 days.

(21) Appl. No.: 17/659,313

(22) Filed: Apr. 14, 2022

(65) Prior Publication Data

US 2022/0381876 A1      Dec. 1, 2022

Related U.S. Application Data

(60) Provisional application No. 63/194,272, filed on May 28, 2021.

(51) Int. Cl.
    *G01S 7/02*      (2006.01)
    *H04L 5/00*      (2006.01)

(52) U.S. Cl.
    CPC .............. *G01S 7/02* (2013.01); *H04L 5/0048* (2013.01); *H04L 5/006* (2013.01)

(58) Field of Classification Search
    CPC .......... G01S 7/02; H04L 5/0048; H04L 5/006
    See application file for complete search history.

(56) References Cited

U.S. PATENT DOCUMENTS

| 8,068,877 | B1 | 11/2011 | Mansour |
| 10,009,782 | B2 * | 6/2018 | Kazmi ................. H04L 5/0005 |

(Continued)

FOREIGN PATENT DOCUMENTS

| EP | 3799508 A1 | 3/2021 |
| WO | 2020057748 A1 | 3/2020 |

(Continued)

OTHER PUBLICATIONS

M. Kiviranta, I. Moilanen and J. Roivainen, "5G Radar: Scenarios, Numerology and Simulations," 2019 International Conference on Military Communications and Information Systems (ICMCIS), Budva, Montenegro, 2019, pp. 1-6, doi: 10.1109/ICMCIS.2019. 8842780. (Year: 2019).*

(Continued)

*Primary Examiner* — William Kelleher
*Assistant Examiner* — Noah Yi Min Zhu

(57) ABSTRACT

A method includes obtaining a first set of signal quality measurements (SQMs) from among a plurality of reference signals received at an electronic device. The SQMs correspond to reference signals, respectively. The reference signals correspond to candidate time slots (CTS), respectively. The method includes identifying a first set of reference signals in the plurality of reference signals based on the first set of SQMs satisfying a first quality condition. The method includes identifying a second set of reference signals in the plurality of reference signals based on the first set of SQMs satisfying a second quality condition. The method includes identifying, as first CTS for an electronic device to use for a radar operation, candidate time slots corresponding to the first set of reference signals. The method includes identifying, as second CTSs for the electronic device to use for wireless communication, CTSs corresponding to the second set of reference signals.

20 Claims, 15 Drawing Sheets

(56) References Cited

U.S. PATENT DOCUMENTS

| | | | |
|---|---|---|---|
| 10,892,789 B2 * | 1/2021 | Abdelmonem | H04W 28/0236 |
| 10,951,285 B2 * | 3/2021 | Sang | H04W 36/06 |
| 10,979,979 B1 | 4/2021 | Kong et al. | |
| 2015/0085686 A1 * | 3/2015 | Chande | H04W 72/542 |
| | | | 370/252 |
| 2018/0139673 A1 | 5/2018 | Peisa | |
| 2019/0293781 A1 * | 9/2019 | Bolin | G01S 13/003 |
| 2020/0107249 A1 | 4/2020 | Stauffer et al. | |
| 2020/0382172 A1 | 12/2020 | Sethuraman et al. | |
| 2021/0067978 A1 * | 3/2021 | Cheraghi | H04B 17/336 |
| 2021/0105644 A1 * | 4/2021 | Mo | H04L 5/0048 |
| 2021/0105708 A1 | 4/2021 | Islam et al. | |
| 2022/0095319 A1 * | 3/2022 | Duan | H04W 72/1268 |
| 2023/0189315 A1 * | 6/2023 | Haustein | H04W 24/02 |
| | | | 370/252 |
| 2023/0266434 A1 * | 8/2023 | Kalantari | H04W 72/541 |
| | | | 342/159 |

FOREIGN PATENT DOCUMENTS

| | | |
|---|---|---|
| WO | 2021030685 A1 | 2/2021 |
| WO | 2021067784 A1 | 4/2021 |
| WO | WO-2021184242 A1 * | 9/2021 |

OTHER PUBLICATIONS

International Search Report and Written Opinion issued Jul. 25, 2022 regarding International Application No. PCT/KR2022/005756, 6 pages.

Extended European Search Report issued Apr. 10, 2024 regarding Application No. 22811491.4, 11 pages.

Kiviranta et al., "5G Radar: Scenarios, Numerology and Simulations", 2019 International Conference on Military Communications and Information Systems (ICMCIS), May 2019, 6 pages.

* cited by examiner

UTILIZATION OF WIRELESS COMMUNICATION REFERENCE SIGNAL MEASUREMENT RESOURCES FOR CO-CHANNEL RADAR OPERATION

CROSS-REFERENCE TO RELATED APPLICATION(S) AND CLAIM OF PRIORITY

This application claims priority under 35 U.S.C. § 119(e) to U.S. Provisional Patent Application No. 63/194,272 filed on May 28, 2021. The above-identified provisional patent application is hereby incorporated by reference in its entirety.

TECHNICAL FIELD

This disclosure relates generally to wireless communication systems. More specifically, this disclosure relates to methods for utilization of wireless communication reference signal measurement resources for co-channel radar operation

BACKGROUND

A communication system includes a DownLink (DL) that conveys signals from transmission points such as Base Stations (BSs) or gNodeBs to User Equipments (UEs) and an UpLink (UL) that conveys signals from UEs to reception points such as gNodeBs. A UE, also commonly referred to as a terminal or a mobile station, may be stationary or mobile and may be a cellular phone, a personal computer device, etc. A gNodeB, which is generally a fixed station, may also be referred to as an access point or other equivalent terminology.

For millimeter wave (mmWave), the number of antenna elements can be large for a given form factor. However, the number of digital chains is limited due to hardware constraints (such as the feasibility to install a large number of ADCs/DACs at mmWave frequencies). In this case, one digital chain is mapped onto a large number of antenna elements which can be controlled by a bank of analog phase shifters. One digital chain can then correspond to one sub-array which produces a narrow analog beam through analog beamforming. This analog beam can be configured to sweep across a wider range of angles by varying the phase shifter bank across a transmission time interval.

SUMMARY

This disclosure provides methods for utilization of wireless communication reference signal measurement resources for co-channel radar operation.

In one embodiment, a method for utilization of wireless communication reference signal measurement resources for co-channel radar operation is provided. The method includes obtaining a first set of signal quality measurements from among a plurality of reference signals received at an electronic device. The signal quality measurements correspond to reference signals, respectively. The reference signals correspond to candidate time slots, respectively. The method includes identifying a first set of reference signals in the plurality of reference signals based on the first set of signal quality measurements satisfying a first quality condition. The method includes identifying a second set of reference signals in the plurality of reference signals based on the first set of signal quality measurements satisfying a second quality condition. The method includes identifying, as first candidate time slots for an electronic device to use for a radar operation, candidate time slots corresponding to the first set of reference signals. The method includes identifying, as second candidate time slots for the electronic device to use for wireless communication, candidate time slots corresponding to the second set of reference signals.

In another embodiment, an electronic device for utilization of wireless communication reference signal measurement resources for co-channel radar operation is provided. The electronic device includes a radar circuit configured for the electronic device to operate using radar operations. The electronic device includes a wireless communication circuit configured for the electronic device to operate using a wireless communication protocol different from the radar operations. The electronic device includes a processor configured to obtain a first set of signal quality measurements from among a plurality of reference signals received at an electronic device. The signal quality measurements correspond to reference signals, respectively. The reference signals correspond to candidate time slots, respectively. The processor is configured to identify a first set of reference signals in the plurality of reference signals based on the first set of signal quality measurements satisfying a first quality condition. The processor is configured to identify a second set of reference signals in the plurality of reference signals based on the first set of signal quality measurements satisfying a second quality condition. The processor is configured to identify, as first candidate time slots for an electronic device to use for a radar operation, candidate time slots corresponding to the first set of reference signals. The processor is configured to identify, as second candidate time slots for the electronic device to use for wireless communication, candidate time slots corresponding to the second set of reference signals.

In yet another embodiment a non-transitory computer readable medium embodying a computer program for utilization of wireless communication reference signal measurement resources for co-channel radar operation is provided. The computer program includes computer readable program code that when executed causes at least one processor to obtain a first set of signal quality measurements from among a plurality of reference signals received at an electronic device. The signal quality measurements correspond to reference signals, respectively. The reference signals correspond to candidate time slots, respectively. The computer readable program code causes the processor to identify a first set of reference signals in the plurality of reference signals based on the first set of signal quality measurements satisfying a first quality condition. The computer readable program code causes the processor to identify a second set of reference signals in the plurality of reference signals based on the first set of signal quality measurements satisfying a second quality condition. The computer readable program code causes the processor to identify, as first candidate time slots for an electronic device to use for a radar operation, candidate time slots corresponding to the first set of reference signals. The computer readable program code causes the processor to identify, as second candidate time slots for the electronic device to use for wireless communication, candidate time slots corresponding to the second set of reference signals.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

Figure 1:
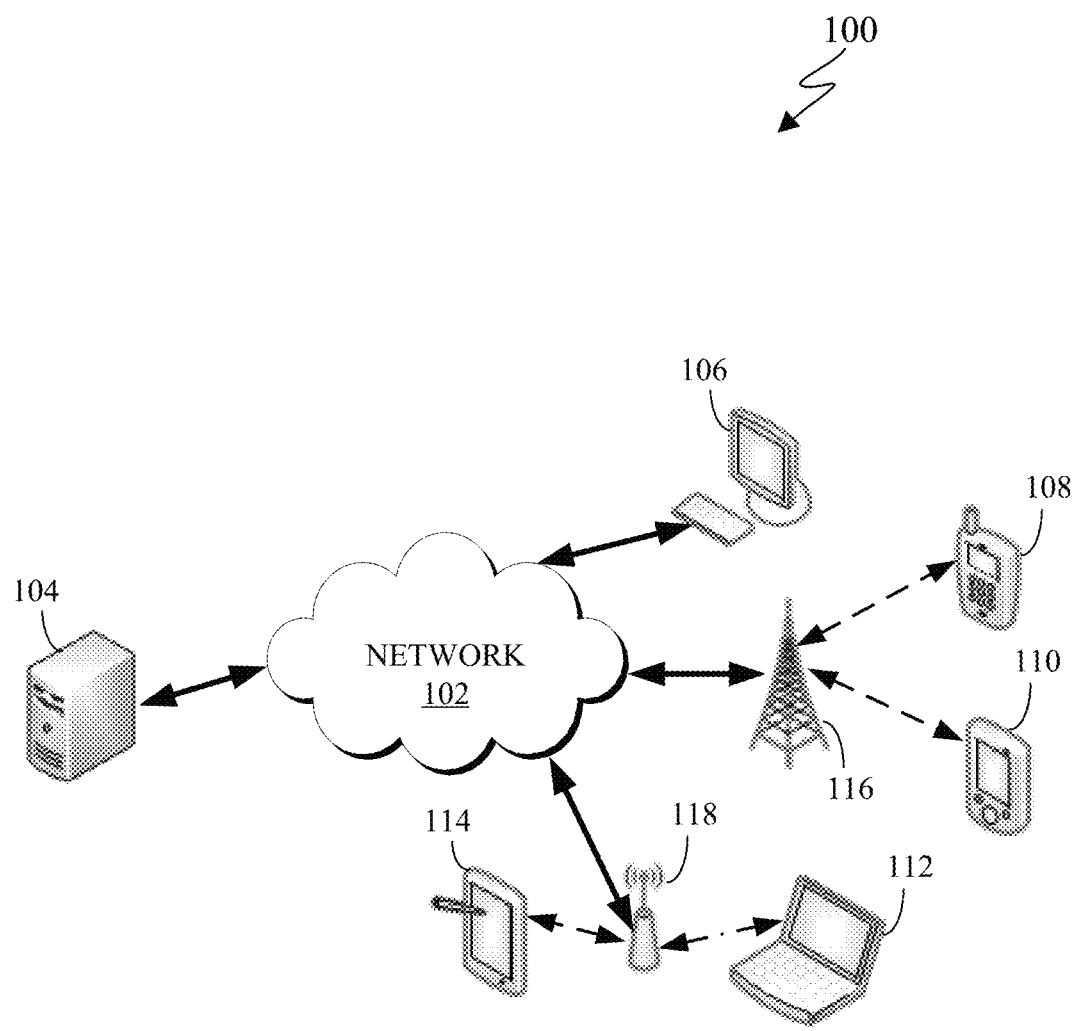
FIG. 1 illustrates an example communication system in accordance with an embodiment of this disclosure.

FIG. 1 illustrates an example communication system in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver.

In this example, some client devices 108 and 110-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
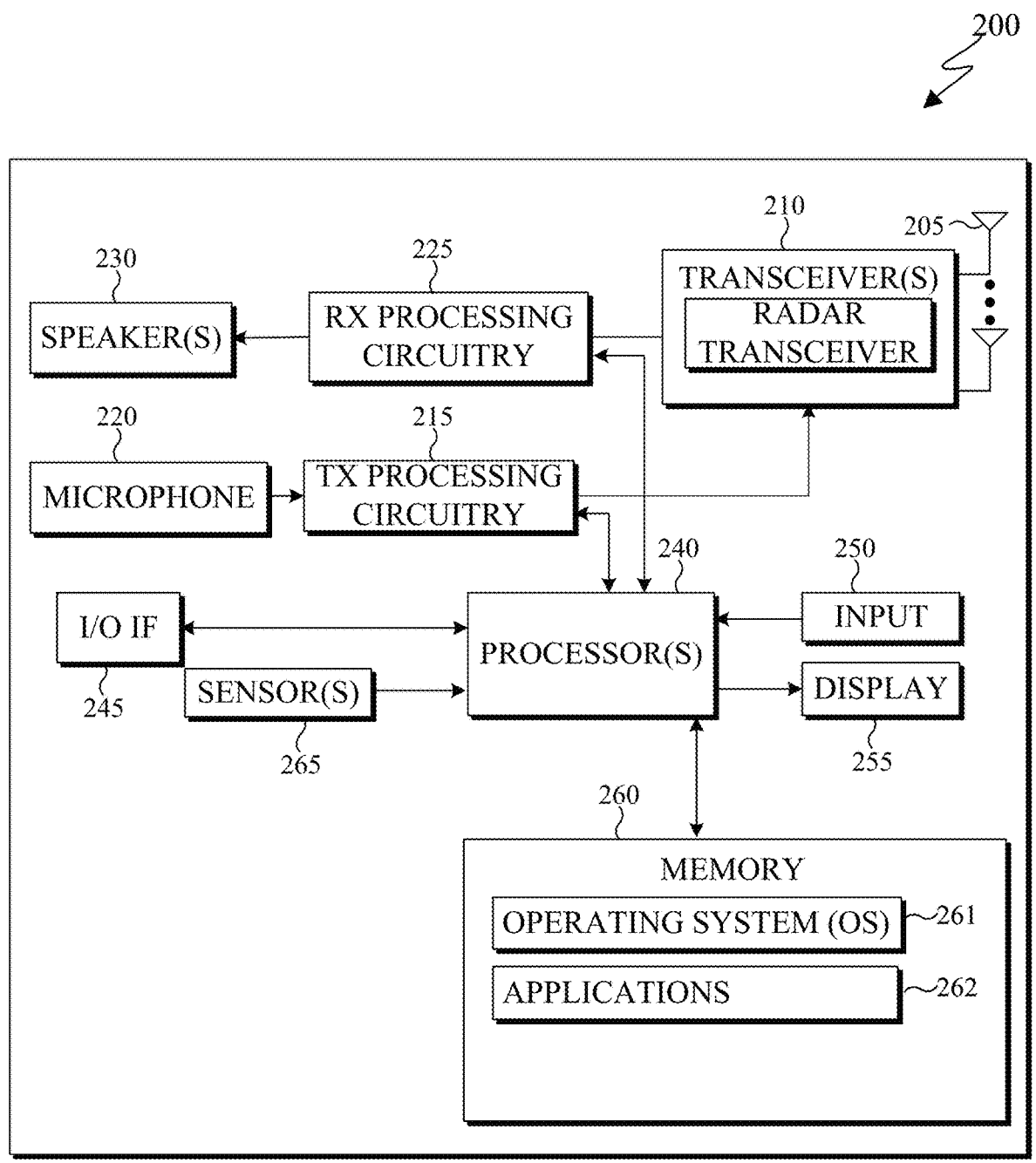
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array 205 including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

The electronic device 200 as used herein can include a transceiver that can both transmit and receive radar signals. For example, the transceiver(s) 210 includes a radar transceiver 270, as described more particularly below. In this embodiment, one or more transceivers in the transceiver(s) 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna). The radar transceiver 270 can transmit signals at a various frequencies For example, the radar transceiver 270 can transmit signals at frequencies including, but not limited to, 6 GHz, 7 GHz, 8 GHz, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. In some embodiments, the radar transceiver 270 can be associated with the input 250 to provide additional inputs to the processor 240.

Figures 3, 4, 5, 6:
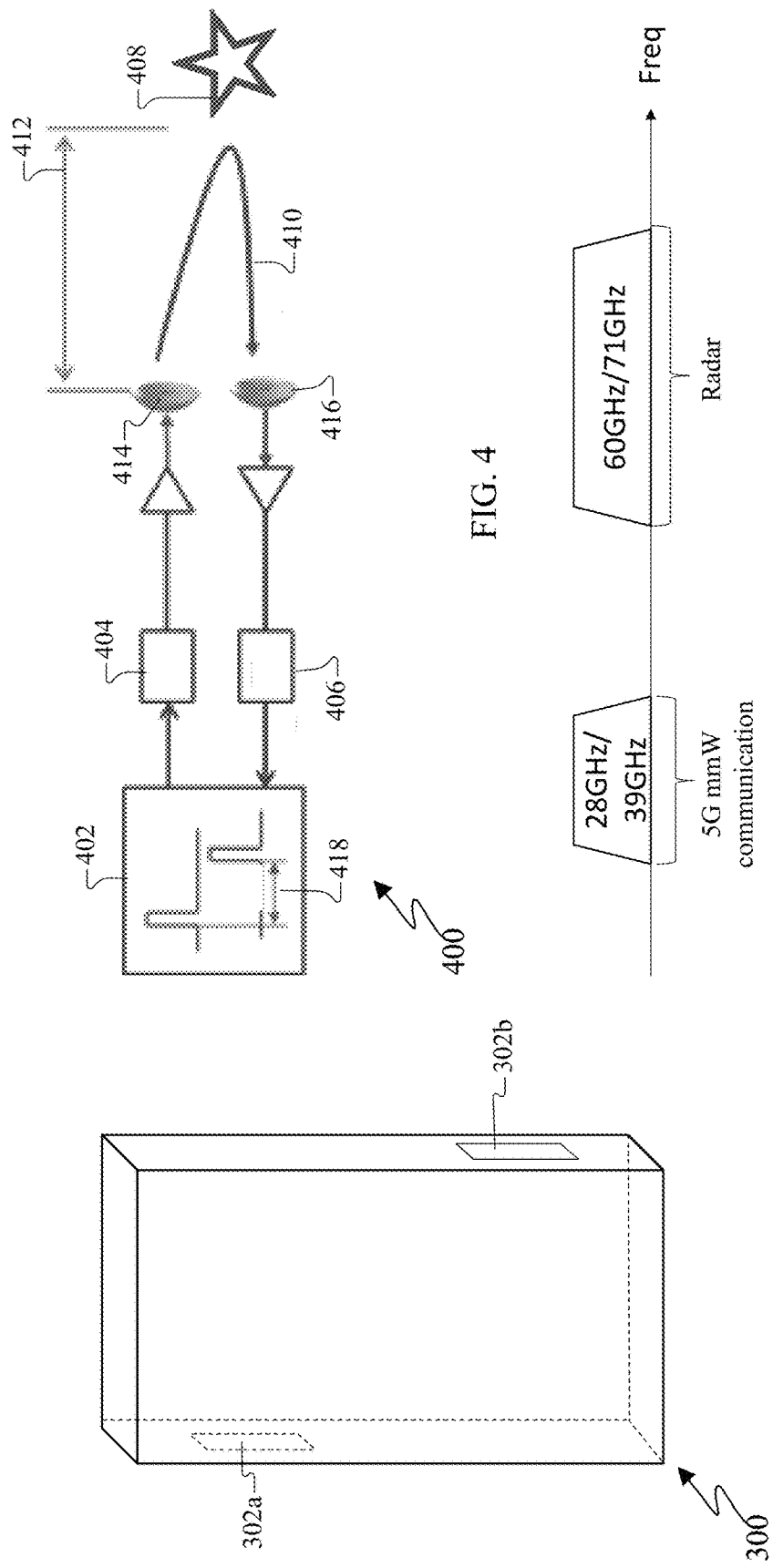
FIG. 3 illustrates a three-dimensional view of an example electronic device that includes multiple millimeter wave (mmWave) antenna modules in accordance with an embodiment of this disclosure.
FIG. 4 illustrates an example architecture of a monostatic radar in an electronic device 400 in accordance with an embodiment of this disclosure.
FIG. 5 illustrates frequency spectra for operating 5G communication at different frequency bands than radar operates in accordance with an embodiment of this disclosure.
FIG. 6 illustrates frequency spectra for 5G communication operations and radar operations sharing the same frequency bands in accordance with an embodiment of this disclosure.

In certain embodiments, the radar transceiver 270 is a monostatic radar. In A monostatic radar includes a transmitter of a radar signal and a receiver, which receives a delayed echo of the radar signal, that are positioned at the same or similar location. For example, the transmitter and the receiver can use the same antenna or nearly-co-located while using separate, but adjacent antennas. Monostatic radars are assumed coherent such that the transmitter and receiver are synchronized via a common time reference. FIG. 4, below, illustrates an example monostatic radar.

In certain embodiments, the radar transceiver 270 can include a transmitter and a receiver. In the radar transceiver 270, the transmitter of can transmit millimeter wave (mmWave) signals. In the radar transceiver 270, the receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

FIG. 3 illustrates a three-dimensional view of an example electronic device 300 that includes multiple millimeter wave (mmWave) antenna modules 302 in accordance with an embodiment of this disclosure. The electronic device 300 could represent one or more of the client devices 106-114 in FIG. 1 or the electronic device 200 in FIG. 2. The embodiments of the electronic device 300 illustrated in FIG. 3 are for illustration only, and other embodiments can be used without departing from the scope of the present disclosure.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

The first antenna module 302a and the second antenna module 302b are positioned at the left and the right edges of the electronic device 300. For simplicity, the first and second antenna modules 302a-302b are generally referred to as an antenna module 302. In certain embodiments, the antenna module 302 includes an antenna panel, circuitry that connects the antenna panel to a processor (such as the processor 240 of FIG. 2), and the processor.

The electronic device 300 can be equipped with multiple antenna elements. For example, the first and second antenna modules 302a-302b are disposed in the electronic device 300 where each antenna module 302 includes one or more antenna elements. The electronic device 300 uses the antenna module 302 to perform beamforming when the electronic device 300 attempts to establish a connection with a base station (for example, base station 116).

FIG. 4 illustrates an example architecture of a monostatic radar in an electronic device 400 in accordance with an embodiment of this disclosure. The embodiments of the architecture of the monostatic radar illustrated in FIG. 4 are for illustration only and other embodiments can be used without departing from the scope of the present disclosure.

The electronic device 400 that includes a processor 402, a transmitter 404, and a receiver 406. The electronic device 400 can be similar to any of the client devices 106-114 of FIG. 1, the electronic device 200 of FIG. 2, or the electronic device 300 of FIG. 3. The processor 402 is similar to the processor 240 of FIG. 2. Additionally, the transmitter 404 and the receiver 406 can be included within the radar transceiver 270 of FIG. 2. The radar can be used to detect the range, velocity and/or angle of a target object 408. Operating at mmWave frequency with GHz of bandwidth (e.g. 2, 3, 5 or 7 GHz bandwidth), the radar can be useful for applications such as proximity sensing, gesture recognition, liveness detection, mmWave blockage detection, and so on.

The transmitter 404 transmits a signal 410 (for example, a monostatic radar signal) to the target object 408. The target object 408 is located a distance 412 from the electronic device 400. In certain embodiments, the target object 408 corresponds to the objects that form the physical environment around the electronic device 400. For example, the transmitter 404 transmits a signal 410 via a transmit antenna 414. The signal 410 reflects off of the target object 408 and is received by the receiver 406 as a delayed echo, via a receive antenna 416. The signal 410 represents one or many signals that can be transmitted from the transmitter 404 and reflected off of the target object 408. The processor 402 can identify the information associated with the target object 408 based on the receiver 406 receiving the multiple reflections of the signals.

The processor 402 analyzes a time difference 418 from when the signal 410 is transmitted by the transmitter 404 and received by the receiver 406. The time difference 418 is also referred to as a delay, which indicates a delay between the transmitter 404 transmitting the signal 410 and the receiver 406 receiving the signal after the signal is reflected or bounced off of the target object 408. Based on the time difference 418, the processor 402 derives the distance 412 between the electronic device 400, and the target object 408. The distance 412 can change when the target object 408 moves while electronic device 400 is stationary. The distance 412 can change when the electronic device 400 moves while the target object 408 is stationary. Also, the distance 412 can change when the electronic device 400 and the target object 408 are both moving.

FIG. 5 illustrates frequency spectra for operating 5G communication at different frequency bands than radar operates in accordance with an embodiment of this disclosure. The example shown in FIG. 5 is one possible frequency operation framework of mmWave communication and radar operation, namely with non-overlapping frequency.

FIG. 6 illustrates frequency spectra for 5G communication operations and radar operations sharing the same frequency bands in accordance with an embodiment of this disclosure. The example shown in FIG. 6 is one possible frequency operation framework of mmWave communication and radar operation, namely with overlapping frequency. The overlapping frequency can be for a particular band, such as the 60 GHz/71 GHz band.

Although FIG. 5 and FIG. 6 illustrate two examples of frequency spectra for 5G communication operations and radar operations, various changes may be made to FIG. 5 and FIG. 6. As a particular example, in another possible frequency operation framework, radar operating at the 24 GHz band can interfere with 5G communication at 28 GHz band.

Figures 7, 8:
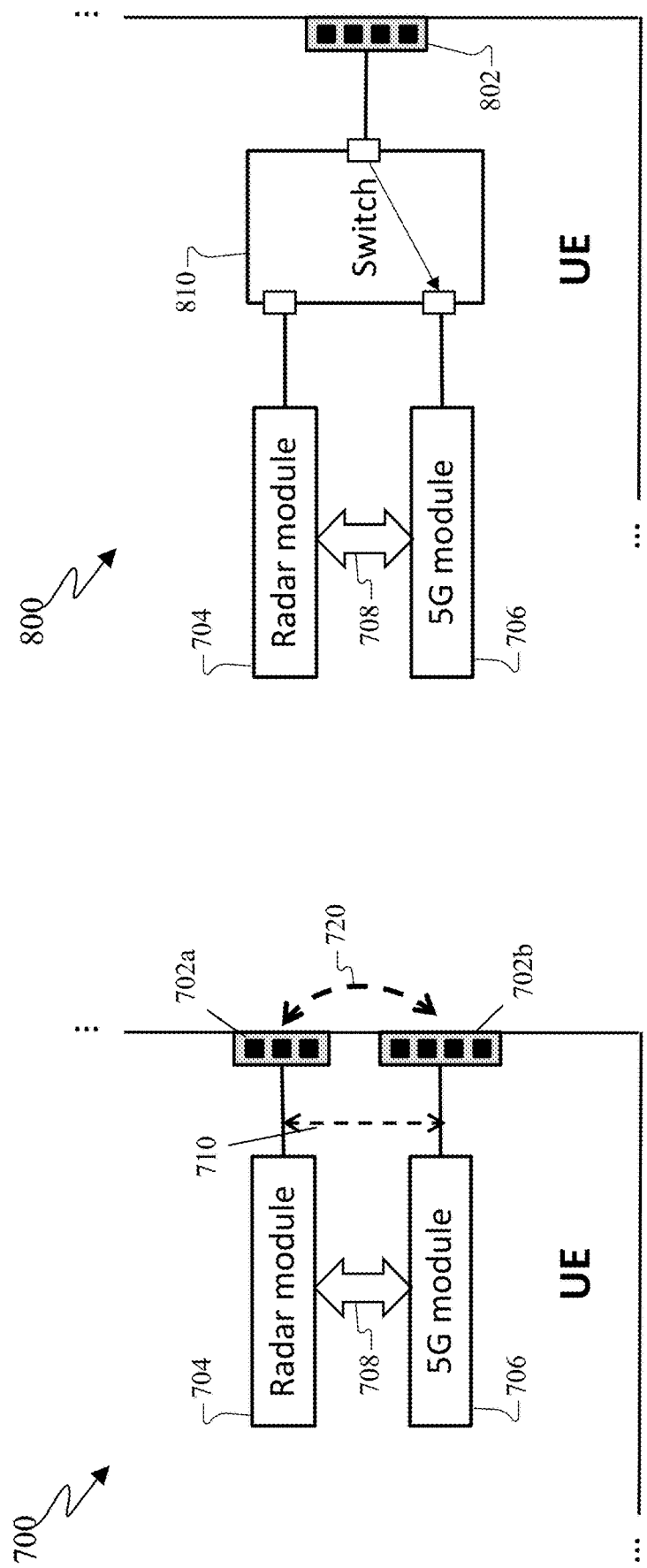
FIG. 7 illustrates an example electronic device that includes an antenna panel for radar operations and a separate antenna panel for 5G communication operations in accordance with an embodiment of this disclosure.
FIG. 8 illustrates an example electronic device that includes a common antenna panel for radar operations and 5G communication operations in accordance with an embodiment of this disclosure.

FIG. 7 illustrates an example electronic device 700 that includes an antenna panel 702a for radar operations and a separate antenna panel 702b for 5G communication operations in accordance with an embodiment of this disclosure.

The architecture of the electronic device 700 includes a radar system (also simply referred to as "radar") that comprises a radar module 704 and the antenna panel 702a. The architecture of the electronic device 700 further includes a wireless communication system that comprises a wireless communication module 706 (for example, a 5G communication module) and the antenna panel 702b. Internally, within the electronic device 700, a control interface 708 connects the radar module 704 to the wireless communication module 706 to enable the two systems to communicate control signals to each other. The antenna panels 702a-702b can be similar to the antenna modules 302 of FIG. 3, or the transmit and receive antennas 414 and 416 of the monostatic radar of FIG. 4. Each of the antenna panels 702a-702b includes multiple antenna elements.

The architecture of the electronic device 700 may suffer from an inter-system interference problem due to a lack of RF isolation between the two systems. As an example, inter-system interference 710 may occur between the internal circuits associated with the radar module 704 and the internal circuits associated with the wireless communication module 706. As another example, RF interference over-the-air 720 may occur inter-system, between the wireless communication system and the radar system.

Independent communication operations and radar operations by an electronic device 700 may not be possible when the radio frequency (RF) isolation between the wireless communication and radar systems is not sufficient. The radar transmission interference to the 5G signal reception can depend on the radar Tx power, the radar bandwidth, the radar Tx power spectral density, and the 5G system bandwidth which is interfered by the radar transmission. For directional radar and/or directional 5G beams, the radar interference level to the 5G DL reception can also be a function of the operating beams. Under this condition of directional beams, simultaneous communication reception and radar transmission (or simultaneous communication transmission and radar reception) may not be feasible due to the interference between the two systems.

In the embodiment shown in FIG. 7, the electronic device 700 includes multiple processors (such as the processor(s) 240 of FIG. 2) comprising the radar module 704 and wireless communication module 706, respectively. This disclosure is not limited to the radar module 704 and the wireless communication module 706 being two discrete hardware components. In other embodiments, the radar module 704 and wireless communication module 706 may be software modules that are stored in memory (such as the memory 260 of FIG. 2) and executed by one or more processors in the electronic device 700. However, for simplicity, the radar module 704 will be described as the radar, which detects the range, velocity and/or angle of a target object (such as the target object 408 of FIG. 4) and which is used for proximity sensing, gesture recognition, liveness detection, mmWave blockage detection, and so on.

The wireless communication module 706 enables the electronic device 700 to perform wireless communication with the network (such as the network 102 of FIG. 1). For example, the wireless communication module 706 enables the electronic device 700 to establish a connection with a base station (for example, base station 116).

A base station 116 could utilize one or multiple transmit beams to cover the whole area of one cell. The base station 116 may form a transmit beam by applying suitable gains and phase settings to an antenna array of the base station. In order to overcome higher propagation losses at higher frequencies such as the mmWave frequency, the base station 116 may form multiple transmit beams, each transmit beam providing coverage over a region narrower than the whole coverage region of the one cell. The wireless communication module 706 may also form receive beams to increase the signal-to-interference-and-noise ratio (SINR) at the receiver within the electronic device 700. Analogously, in the uplink scenario, the wireless communication module 706 may form transmit beams, and the base station 116 may form receive beams.

The electronic device 700, using wireless communication module 706, and the base station 116 implement a beam sweeping procedure to assist the electronic device 700 in determining or selecting the electronic device's receive beam and/or transmit beam. The beam sweeping procedure includes the base station 116 transmitting a set of transmit beams to sweep the cell area, and the electronic device 700 measuring the signal quality on different beams using electronic device's downlink receive beams. To facilitate candidate beam identification, beam measurement, and beam quality reporting, the base station 116 configures the electronic device 700 with one or more reference signal (RS) resource corresponding to a set of downlink TX beams. Examples of an RS resource include an SSB, channel state information RS (CSI-RS) resource, and/or CSI-RS resource indicator (CRI). The CSI-RS resources can be periodic, aperiodic, or semi-persistent. An RS resource refers to a reference signal transmission on a combination of one or more time/frequency/spatial domain locations. As an example, the time domain, frequency domain, and spatial domain can be represented as an Orthogonal Frequency Division Modulation (OFDM) symbol, resource element, and antenna port, respectively. For each DL receive beam, the electronic device 700 reports different DL transmit beams received using that DL receive beam, ranked in order of signal strength (RSRP) and optionally CSI. Examples of CSI include Channel Quality Indicator (CQI), Precoding Matrix Indicator (PMI), or rank indicator (RI). Based on the measurement report feedback received from the electronic device 700, the base station 116 indicates to the electronic device 700 with one or more Transmission Configuration Indicator (TCI) states for reception of Physical Downlink Control Channel (PDCCH) and/or Physical Downlink Shared Channel (PDSCH).

To compensate for the narrower analog beamwidth in mmWave, electronic device 700 can employ analog beam sweeping to enable wider signal reception or transmission coverage for the electronic device 700. A beam codebook includes a set of codewords, where a codeword is a set of analog phase shift values, or a set of amplitude plus phase shift values, applied to the antenna elements, in order to form an analog beam.

The electronic device 700, using the wireless communication module 706, implements a beam management procedure to maintain the selected antenna module as well as the corresponding selected beam of the antenna module for signal reception and transmission by the electronic device 700. The electronic device 700 can use multiple antenna panels 702a-702b simultaneously, in which case the beam management procedure can select a beam of each antenna panel 702a and 702b for signal reception and transmission by the electronic device 700.

FIG. 8 illustrates an example electronic device 800 that includes a common antenna panel 802 for radar operations and 5G communication operations in accordance with an embodiment of this disclosure. The electronic device 800 further includes a radar module 704, wireless communication module 706, and control interface 708, which may be the same as or similar to corresponding components in FIG. 7. The electronic device 800 includes a switch 810 that connects the antenna panel 802 to the wireless communication module 706 for wireless communication operations, and that switches to alternatively connect the antenna panel 802 to the radar module 704 for radar operations. The antenna panel 802 can be similar to the antenna module 302 of FIG. 3, and includes multiple antenna elements. As described above, due to a lack of RF isolation between the two systems, inter-system interference may occur in the switch 810 due to imperfect isolation.

Although FIG. 7 and FIG. 8 illustrate two examples of an electronic device that includes a radar module and a wireless communication module, various changes may be made to FIG. 7 and FIG. 8. As a particular example, the wireless communication module 706 and the radar module 704 can be manufactured by the same manufacturer or by different manufacturers the control interface 708 provides.

Figure 9:
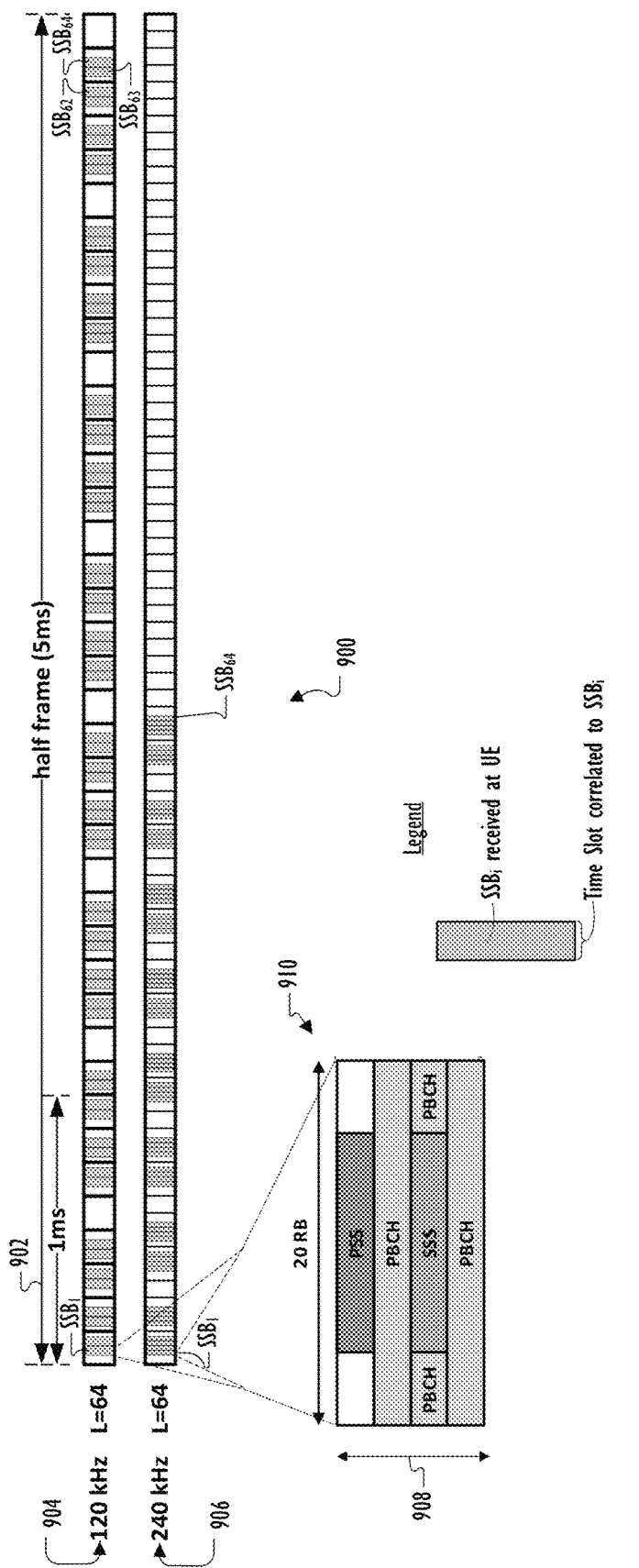
FIG. 9 illustrates a time-domain mapping of Synchronization Signal Block (SSB) time slots in a half frame in accordance with an embodiment of this disclosure.

FIG. 9 illustrates a time-domain mapping 900 of Synchronization Signal Block (SSB) time slots in a half frame in accordance with an embodiment of this disclosure. The embodiment of the time-domain mapping 900 shown in FIG. 9 is for illustration only, and other embodiments could be used without departing from the scope of this disclosure.

As a particular example, the half frame 902 is 5 milliseconds in time-domain mapping 900. A half frame includes a number L of SSBs, herein referred to as a burst of SSBs. The half frame 902 includes SSB time slots 904 and 906 for up to 64 SSBs for SSB subcarrier spacing (SCS) of 120 kHz and 240 kHz, respectively. In certain embodiments, the SSB time-domain mapping is periodic with a 20 ms interval by default, but other periodicities such as 40 ms and 80 ms are also possible depending on network configuration. The SSB duration 908, for a single SSB 910, is about 17.85 microseconds (µs) and 35.66 µs for SSB SCS of 240 kHz and 120 kHz, respectively. Similarly, a half frame 902 can include about twice as many SSB time slots 906 for SSB SCS of 240 kHz, compared to the number of SSB time slots 904 for SSB SCS of 120 kHz. The frequency domain of the SSB 910 can include twenty resource blocks. As an example, the SSB 910 can include a sequence of a Primary Synchronization Signal (PSS), physical broadcast channel (PBCH), secondary synchronization signal (SSS) concurrent with two PBCH, and PBCH. Each SSB 910 can be identified by an SSB index (i), for example. For example, the SSB index i=1 and i=64 can identify a first SSB (shown as $SSB_1$) and a last SSB (shown as $SSB_{64}$) of the half frame.

As introduced above, the base station 116 configures the electronic device 200 with RS resources, such as SSBs 910, by transmitting a set of reference signals via a corresponding set of DL transmit beams to sweep the cell area. The electronic device 200 receives the set of reference signals as a burst of SSBs. As a particular example, all of the SSBs 910 within a half frame 902 can be a burst of SSBs (such as $\{SSB_1, SSB_i, \ldots, SSB_{64}\}$). As shown be the legend of FIG. 9, the time slot during which a particular SSB (for example, $SSB_i$) is received at the electronic device 200 is correlated to that particular SSB. In certain scenarios, the electronic device 200 receives consecutive SSBs that are contiguous SSBs, such as $SSB_{63}$ and $SSB_{64}$, but other consecutive SSBs can be non-contiguous, such as $SSB_{62}$ and $SSB_{63}$. The electronic device 200 implements a beam management procedure, in which to select a beam for the electronic device 200 to connect to the network via a base station, the electronic device 200 measures one or more RS resource corresponding to a set of base station transmit (TX) beams. The electronic device 200 can be configured to measure the SSB 910 to generate measurement quantities such as SS reference signal received power (SS-RSRP), SS reference signal received quality (SS-RSRQ), or SS signal-to-interference and noise ratio (SS-SINR). The measurement quantities generated from an SSB quantify signal quality of the SSB. The electronic device 200 can measure SS-RSRP for Layer 3 (L3) reporting, and also for Layer 1 (L1) reference signal received power (L1-RSRP). The electronic device 200 measures SS-RSRP among the reference signals corresponding to SSBs with the same SSB index and the same physical-layer cell identity (PCI). The electronic device 200 can select a DL TX beam and/or DL RX beam that satisfy beam selection criteria. In certain embodiments, the reporting range of SS-RSRP for L3 reporting is defined from −156 dBm to −31 dBm with 1 dB resolution. In certain embodiments, the reporting range of SS-RSRP and CSI-RSRP for L1 reporting is defined from −140 to −40 dBm with 1 dB resolution.

Figure 10A:
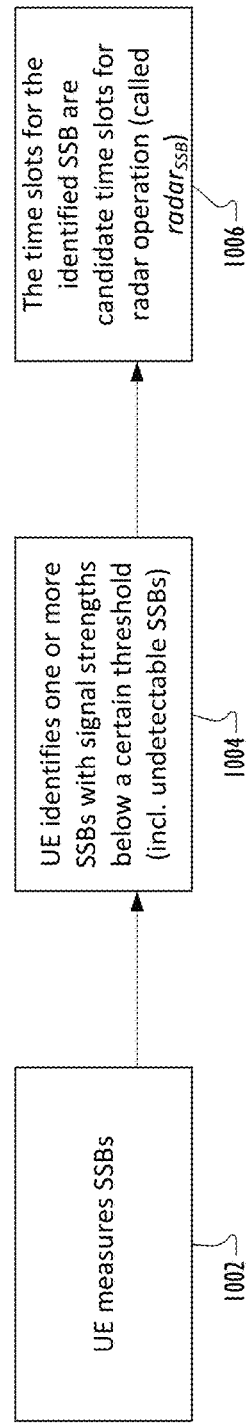
FIG. 10A illustrates a process for identifying SSB time slots as candidate time slots for radar operation in accordance with an embodiment of this disclosure.

FIG. 10A illustrates a process 1000 for identifying SSB time slots as candidate time slots for radar operation in accordance with an embodiment of this disclosure. An embodiment of the process 1000 shown in FIG. 10A is for illustration only. One or more of the components illustrated in FIG. 10A can be implemented in specialized circuitry configured to perform the noted functions or one or more of the components can be implemented by one or more processors executing instructions to perform the noted functions. Other embodiments are used without departing from the scope of the present disclosure. The process 1000 can be implemented by the wireless communication module 706 of FIG. 7, but for simplicity, will be described as being performed by processor 240 of the electronic device 200 of FIG. 2.

At block 1002, the processor 240 measures SSBs, generating one or more measurement quantities for each SSB. For example, the processor 240 may measure each SSB 910 from among the burst of SSBs in the half frame 902. For a particular cell identified by PCI, different SSBs of the same cell have different SSB indices, respectively. The signal quality of one SSB can vary significantly from a different SSB of the same cell because different SSBs of the same cell typically cover different regions of the cell.

According to embodiments of this disclosure, the electronic device 200 may be configured to perform operations for wireless communication during time slots that contain an SSB suitable for monitoring (referred to as a "monitored SSB") or continuous measurement. The electronic device 200 performs monitoring of an SSB by performing continuous measurement of the SSB, such as performing 5G NR measurement on the SSB, thereby generating signal quality measurement quantities of the SSB. A monitored SSB has signal quality measurement quantities that are greater than or equal to a certain threshold $\Delta_{MonitoredSSB}$. In certain embodiments, the threshold $\Delta_{MonitoredSSB}$ is −140 dBm. An SSB that has signal quality measurement quantities that are less than the threshold $\Delta_{MonitoredSSB}$ may be difficult for the electronic device 200 to detect, and can be referred to as an undetectable SSB. To conserve energy, the electronic device 200 may be configured to refrain from performing wireless communication during time slots that contain an undetectable SSB.

At block 1004, the processor 240 identifies a first set of SSBs that satisfy a quality condition by comparing a certain threshold $\Delta_{MonitoredSSB}$ to the signal quality measurement quantities of each SSB 910 from among the burst of SSBs. As an example of satisfying the quality condition, the electronic device 200 can require the first set of SSBs to have signal strengths below the threshold $\Delta_{MonitoredSSB}$. The first set of SSBs is a subset of the burst of SSBs. In some embodiments, after all the SSBs of a burst of SSBs have been measured, the processor 240 identifies the first set of SSBs.

At block 1006, the processor 240 identifies the time slots during which the first set of SSBs are received at the electronic device 200, respectively. That is, the time slots correlated to the identified first set of SSBs are identified as candidate time slots for radar operation, interchangeably denoted as $radar_{SSB}$ or as "first candidate time slots." Hereafter, the process 1000 is referred to as $radar_{SSB}$ determination procedure 1000.

Figure 10B:
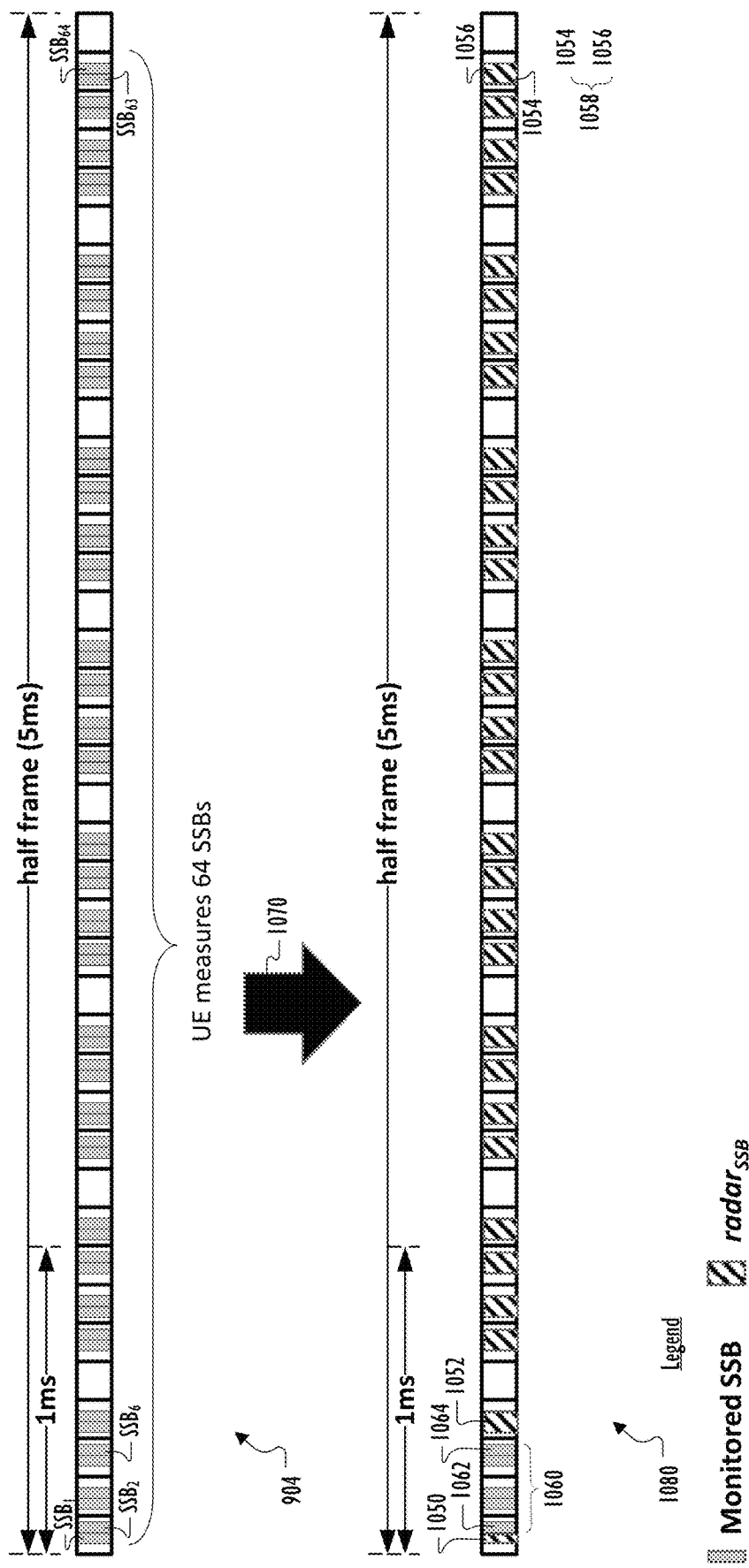
FIG. 10B illustrates candidate time slots for radar operation identified as a result of executing a process for identifying SSB time slots as candidate time slots for radar operation of FIG. 10A in accordance with an embodiment of this disclosure.

FIG. 10B illustrates candidate time slots for radar operation ($radar_{SSB}$) identified as a result of executing the $radar_{SSB}$ determination procedure 1000 of FIG. 10A in accordance with an embodiment of this disclosure. Particularly, as shown in FIG. 10B, in certain scenarios, the processor 240 (at block 1006 of the $radar_{SSB}$ determination procedure 1000 of FIG. 10A) identifies a $radar_{SSB}$ 1050 that is contiguous with a time slot 1062 correlated to a monitored SSB, such as the time slot(s) correlated to $SSB_1$ and $SSB_2$ respectively. In other scenarios, the processor 240 identifies a first candidate time slot 1054 for radar operation that is contiguous with another first candidate time slot 1056, such as the time slot(s) correlated to $SSB_{63}$ and $SSB_{64}$. In certain embodiments, the contiguous time slots correlated to $SSB_{63}$ and $SSB_{64}$ can be identified by the processor 240 as combined into a single $radar_{SSB}$ 1058 in certain embodiments. In certain embodiment, the contiguous time slots correlated to $SSB_{63}$ and $SSB_{64}$ can be identified by the processor 240 as two first candidate time slots 1054 and 1056 in other embodiments.

For ease of explanation, FIG. 10B includes a reproduction of the time-domain mapping of SSB time slots 904 for SSB SCS of 120 kHz within the half frame of FIG. 9. The arrow 1070 represents execution of the $radar_{SSB}$ determination procedure 1000 of FIG. 10A by the electronic device 200. The result 1080 of executing the $radar_{SSB}$ determination procedure 1000 is shown below the arrow 1070. The result 1080 includes the candidate time slots (1050 and 1052 through 1058) for radar operation identified, which are shown as overlapping the time-domain mapping of SSB time slots 904.

As a particular example of the result 1080, the first set of SSBs is identified as $\{SSB_1, SSB_7, \ldots, SSB_{64}\}$, which includes SSBs that are not suitable for continuous measurement. The first candidate time slots include the $radar_{SSB}$ (1050 and 1052 through 1058, respectively) correlated to $SSB_1$ and $SSB_7$ through $SSB_{64}$, respectively. The second through sixth SSBs ($SSB_2$-$SSB_6$) are monitored SSBs, which satisfy criterion for continuous measurement, and which form a second set of SSBs correlated to the monitored time slots 1060 ($Monitored_{SSB}$), respectively. The monitored time slots 1060 correlated to the monitored SSBs are referred to as a second set of candidate time slots ($Monitored_{SSB}$) and include the time slot 1062 correlated to $SSB_2$ through the time slot 1064 correlated to $SSB_6$. The subprocess of identifying which SSBs are suitable for continuous measurement is described below with reference to block 1550 of FIG. 15. In this particular example of the result 1080, the identified first set of SSBs is a subset of the burst of SSBs, and the remainder of the burst of SSBs forms the second set of SSBs.

This disclosure provides various embodiments of a selection criteria for selecting/identifying time slots that contain an SSB suitable for radar operations. According to Technical Specification (TS) 38.214, the UE may assume that the DM-RS antenna port associated with PDCCH receptions in the CORESET configured by pdcch-ConfigSIB1 in Master Information Block (MIB), the DM-RS antenna port associated with corresponding PDSCH receptions, and the corresponding SS/PBCH block are quasi co-located (QCL) with respect to average gain, QCL-TypeA, and QCL-TypeD properties, when applicable, if the UE is not provided a TCI state indicating quasi co-location information of the DM-RS antenna port for PDCCH reception in the CORESET. The value for the DM-RS scrambling sequence initialization is the cell ID. A SCS is provided by subCarrierSpacingCommon in MIB. In another embodiment, if a gNB further configures resources in the gap symbols between SS/PBCH blocks for other DL transmission to be quasi co-located (QCLed) with one SS/PBCH block (in terms of QCL-typeD), the configured resources can be selected along with the QCLed SS/PBCH block and used for radar transmission. This is because if an SSB does not have sufficiently strong signal strength/quality and hence is suitable for $radar_{SSB}$, the other DL transmission which is QCLed with the SSB can also be considered to be suitable for $radar_{SSB}$ as the signal quality for the DL transmission would be similar to that of the SSB. In one example, the configured resources for other DL transmission can be for PDCCH (for example, Type0-PDCCH). In another example, the configured resources for other DL transmission can be for PDSCH (for example, PDSCH of RMSI). In yet another example, the configured resources for other DL transmission can be for CSI-RS.

In another embodiment of the selection criteria for selecting/identifying time slots that contain an SSB suitable for radar operations, an additional condition can be applied to the identifying of $radar_{SSB}$, such as temporal condition. As an example of the temporal condition, the electronic device 200 can require the $radar_{SSB}$ to have a contiguous time duration that is greater than or equal to a minimum contiguous time duration for radar operation. If the minimum contiguous time duration for radar operation is 50 µs, and if the earliest SSB time slot 1050, from among the candidate time slots (1050 and 1052 through 1058) that satisfy a quality condition (e.g., having a signal quality less than the threshold $\Delta_{MonitoredSSB}$), has a contiguous time duration that is approximately 35.66 µs in the example scenario shown in FIG. 10B, then the earliest SSB time slot 1050 does not satisfy the temporal condition and would not be identified as a $radar_{SSB}$. However, the remainder of the candidate time slots (1052 through 1058) that satisfy the quality condition have a contiguous time duration that is approximately 71.32 µs, respectively, and hence are identified by the electronic device 200 as being $radar_{SSB}$.

The signals of the SSBs arriving at the UE can change over time due to possible UE mobility (relative to a stationary base station) and change of surroundings of the UE, or other changes in channel conditions. Therefore, if the condition of the current SSB(s) being measured has changed, the UE can determine to update the $radar_{SSB}$, as described in FIG. 11.

Figure 11:
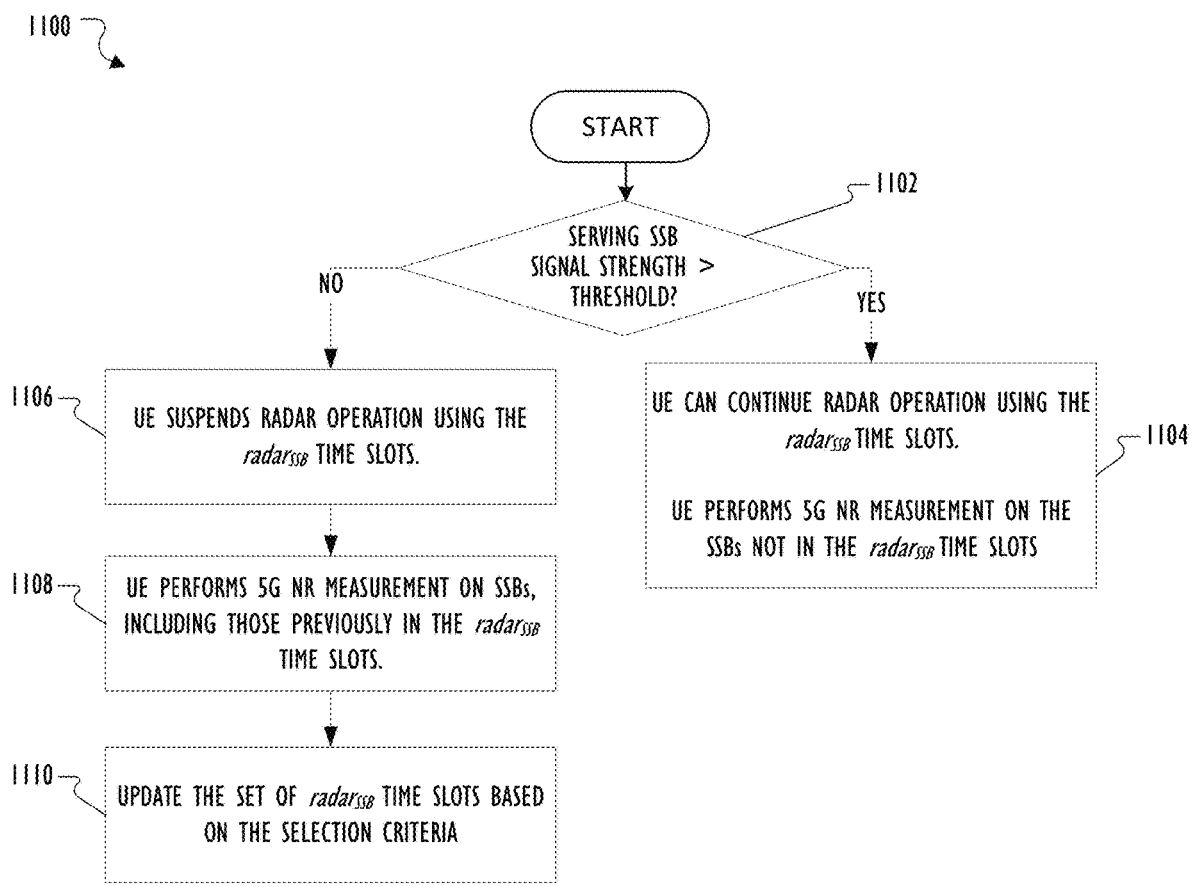
FIG. 11 illustrates a process for updating the identified candidate time slots for radar operation in accordance with an embodiment of this disclosure.

FIG. 11 illustrates a process 1100 for updating the identified candidate time slots for radar operation ($radar_{SSB}$)) in accordance with an embodiment of this disclosure. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure. The process 1100 can be implemented by the wireless communication module 706 of FIG. 7, but for simplicity, will be described as being performed by processor 240 of the electronic device 200 of FIG. 2.

The process 1100 starts when signal quality measurement quantities for each SSB in a second burst of SSBs have been generated by the electronic device 200. The electronic device 200 obtains a second burst of SSBs subsequent to obtaining the first burst of SSBs. The first burst of SSBs (as introduced above in the $radar_{SSB}$ determination procedure 1000 of FIG. 10A) is the basis upon which the electronic device 200 identifies the first candidate time slots ($radar_{SSB}$), and anytime the base station transmits a burst of SSBs, the electronic device 200 obtains the burst of SSBs from the base station. The second burst of SSBs is the basis upon which the electronic device 200 determines (at block 1102) whether to update the first candidate time slots ($radar_{SSB}$). This disclosure does not limit the second burst of SSBs to being the next burst of SSBs obtained immediately following the first burst of SSB, and in certain scenarios, one or more bursts of SSBs may be obtained intermediately between the first and second burst of SSBs. That is, after the first candidate time slots ($radar_{SSB}$) have been identified based on the first burst of SSBs, the electronic device 200 can: suspend monitoring each $radar_{SSB}$; and continue monitoring the monitored time slots 1060 ($Monitored_{SSB}$) that correlate to the second set of SSBs ($SSB_2$-$SSB_6$), respectively, thereby generating one or more signal quality measurement quantities for each SSB 910 in the subsequent bursts of SSBs.

At block 1102, the processor 240 determines whether to update the first candidate time slots ($radar_{SSB}$) based on an update-triggering condition. When the update-triggering condition is not satisfied, the processor 240 determines not to update the first candidate time slots, and proceeds to block 1104. When the update-triggering condition is satisfied, the processor 240 determines to update the first candidate time slots, and proceeds to block 1106. This disclosure provides various embodiments of an update-triggering condition which can be satisfied by the signal quality measurement quantities of the second burst of SSBs.

In some embodiments, the update-triggering condition is a change condition, such as a serving SSB signal quality change condition that is satisfied when the signal quality of the serving SSB has fallen by a sufficiently large amount, for example, fallen below a certain threshold $\Delta_{FallenQuality}$ (e.g., 3 dB or 6 dB) with respect to a reference signal quality. The serving SSB is the SSB which is in the corresponding transmitting mmWave beam that is used for wireless communication with the UE. In this embodiment, the signal quality and/or strength of the serving SSB immediately after the last (i.e., most recent) execution of the $radar_{SSB}$ determination procedure 1000 is an example of the reference signal quality used to determine if the signal quality of the serving SSB has fallen below the threshold $\Delta_{FallenQuality}$.

In some embodiments, the update-triggering condition is a change condition, such as a least-strong SSB quality change condition that is satisfied when the signal quality of the least strong SSB from among the current set of monitored time slots 1060 ($Monitored_{SSB}$) has fallen by a sufficiently large amount, for example, fallen below a certain threshold $\Delta_{FallenQuality}$ (e.g., 3 dB or 6 dB) with respect to a reference signal quality. In this embodiment, the signal quality of the least strong SSB immediately after the last execution of the $radar_{SSB}$ determination procedure 1000 is an example of the reference signal quality used to determine if the signal quality of the serving SSB has fallen below the threshold $\Delta_{FallenQuality}$.

In some embodiments, the update-triggering condition is a change condition, such as a ranked-strongest SSB quality change condition that is satisfied when the signal quality of the jth strongest SSB in the current set of monitored time slots 1060 ($Monitored_{SSB}$) has fallen by a sufficiently large amount, for example, fallen below a certain threshold $\Delta_{FallenQuality}$ (e.g., 3 dB or 6 dB) with respect to a reference signal quality. From among the monitored SSBs ($SSB_2$-$SSB_6$) correlated to the monitored time slots 1060 ($Monitored_{SSB}$), each monitored SSB has a ranking (j) that is based on signal quality measurement quantities, which are ranked in order from strongest (j=1), to $2^{nd}$ strongest (j=2), to $3^{rd}$ strongest (j=3), and so forth. In this embodiment, the signal quality of the jth strongest SSB immediately after the last execution of the $radar_{SSB}$ determination procedure 1000 is an example of the reference signal quality used to determine if the SSB having a signal quality that is currently ranked jth strongest has fallen below the threshold $\Delta_{FallenQuality}$.

At block 1104, in response to the determination to not update the first candidate time slots, the processor 240 continues to perform radar operations during the existing first candidate time slots and continues to perform wireless communication operations during the SSB time slots that are not $radar_{SSB}$. As an example of the wireless communication operations, the processor 240 continues to perform 5G NR measurement on the SSBs that are not correlated to (or received in) the first candidate time slots. In as particular example referring to FIG. 10B, radar operations continue during each existing $radar_{SSB}$ 1050 and 1052-1058, and wireless communication operations continue during each existing $Monitored_{SSB}$ 1062-1064.

At block 1106, in response to the determination to update the first candidate time slots, the processor 240 suspends the electronic device 200 from performing radar operations during the first candidate time slots. The first candidate time slots ($radar_{SSB}$) become obsolete at this time, for example, when the determination to update is made or when the radar operations are suspended.

At block 1108, while the radar operations are suspended, the processor 240 performs wireless communication operations during the obsolete first candidate time slots. Particularly, the electronic device 200 obtains and monitors a third burst of SSBs, for example, by performing 5G NR measurement for the SSBs 910 received during the obsolete first candidate time slots and during the SSB time slots that are not $radar_{SSB}$. In as particular example referring to FIG. 10B, signal quality measurement quantities are generated for SSBs received during each obsolete $radar_{SSB}$ 1050 and 1052-1058 and during the remainder of the SSB time slots 1062-1064.

At block 1110, the processor 240 updates the first candidate time slots (radar$_{SSB}$) based on a selection criteria for selecting/identifying time slots that contain an SSB suitable for radar operations. To update the first candidate time slots (radar$_{SSB}$), the processor 240 repeats the radar$_{SSB}$ determination procedure 1000 of FIG. 10A, such that the updated first candidate time slots are identified based on the third burst of SSBs instead of the first burst of SSBs.

Figure 12:
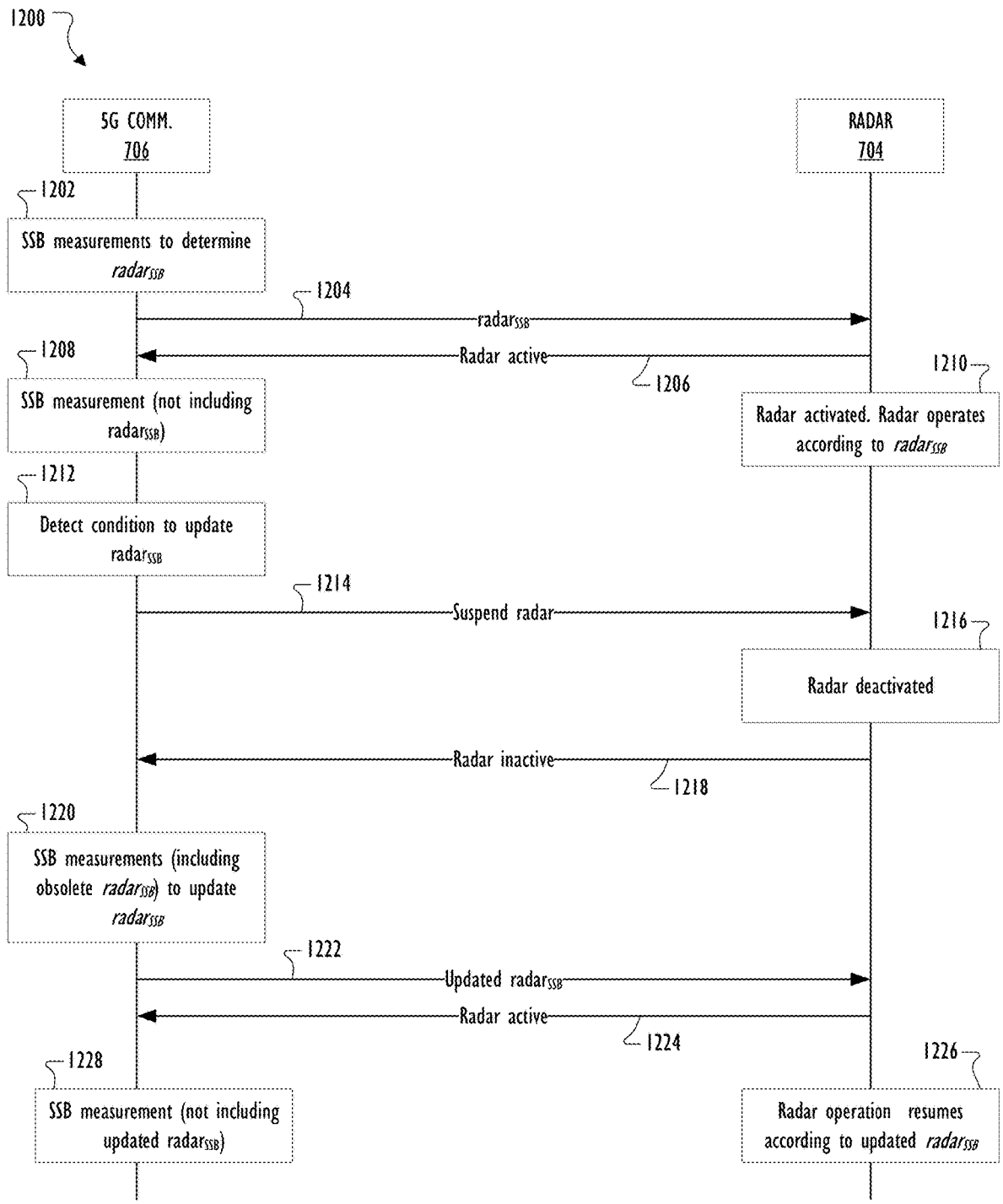
FIG. 12 illustrates a coordination protocol between a wireless communication module and a radar module that implement the processes of identifying and updating candidate time slots for radar operation in accordance with an embodiment of this disclosure.

FIG. 12 illustrates a coordination protocol 1200 between a wireless communication module and a radar module that implement the processes 1100 of identifying and updating candidate time slots for radar operation in accordance with an embodiment of this disclosure. The embodiment of the coordination protocol 1200 shown in FIG. 12 is for illustration only, and other embodiments could be used without departing from the scope of this disclosure. The coordination protocol 1200 will be described as being performed by the wireless communication module 706 and the radar module 704 of FIG. 7, which communicate with each other via the control interface 708.

At block 1202, the wireless communication module 706 measures the SSBs to determine first candidate time slots (radar$_{SSB}$), and sends the radar$_{SSB}$ information 1204 to the radar module 704. In certain embodiments, the first candidate time slots (radar$_{SSB}$) can be determined as SSBs of the serving cell that are not included in ssb-ToMeasure signaling transmitted DL by the gNB. The procedure performed at block 1202 is similar to the radar$_{SSB}$ determination procedure 1000 of FIG. 10A. Particularly, the wireless communication module 706 receives a first burst of SSBs in a half frame 902; measures each SSB 910 received in the first burst of SSBs; and identifies, based on a selection criteria for selecting/identifying time slots that contain an SSB suitable for radar operations, a first set of SSBs that are not suitable for monitoring and first candidate time slots (radar$_{SSB}$) that are correlated to the first set of SSBs, respectively. The radar$_{SSB}$ information 1204 notifies the radar module 704 of candidate time slots during which the radar module 704 is allowed to perform radar operations. For example, the radar$_{SSB}$ information 1204 can indicate each radar$_{SSB}$ among the first candidate time slots, or each Monitored$_{SSB}$ among the monitored time slots 1060.

After receiving the radar$_{SSB}$ information 1204, the radar module 704 sends a radar active message 1206 that informs the wireless communication module 706 that the radar module 704 is active and is operating (transmit and receive radar signals) by utilizing the time slots indicated by the radar$_{SSB}$ information 1204. In certain embodiments, the radar module 704 activates in response to receiving the radar$_{SSB}$ information 1204.

At block 1208, the wireless communication module 706 continues to perform wireless communication operations during the SSB time slots that are not radar$_{SSB}$. Particularly, the wireless communication module 706 continues to perform 5G NR measurement on the SSBs that are not correlated to (or not received in) the first candidate time slots.

At block 1210, the radar module 704 is activated and performs radar operations during the first candidate time slots (radar$_{SSB}$). In certain embodiments, the radar module 704 commences to perform radar operations during the first candidate time slots (radar$_{SSB}$) in response to sending the radar active message 1206. In certain embodiments, the radar module 704 commences to perform radar operations during the first candidate time slots (radar$_{SSB}$) in response to receiving the radar$_{SSB}$ information 1204.

At block 1212, the wireless communication module 706 detects that an update-triggering condition to update radar$_{SSB}$ is satisfied and indicates to the radar module 704 to suspend the radar operation. Particularly, the wireless communication module 706 sends, in response to the determination to update the first candidate time slots, sends a suspend radar message 1214 to indicate to the radar module 704 to suspend the radar operation. The radar$_{SSB}$ is considered obsolete based on the update-triggering condition to update radar$_{SSB}$ being satisfied. The procedure performed at block 1212 can be the same as or similar to the decision block 1102 of FIG. 11.

At block 1216, radar operations are suspended. For example, the radar module 704 is deactivated. More particularly, in response to receiving the suspend radar message 1214, the radar module 704 suspends performing radar operations and/or deactivates the radar transmit and receive operation. The radar module 704 sends a radar inactive message 1218 to the wireless communication 706 to indicate that the radar module 704 is in an inactive state (such as a deactivated state) and/or the radar operations are stopped. The procedure performed at block 1216 can be the same as or similar to the procedure of block 1106 of FIG. 11.

At block 1220, in order to identify new radar$_{SSB}$, the wireless communication module 706 performs SSB measurement for updating the radar$_{SSB}$, including measuring SSBs received during the obsolete first candidate time slots. More particularly, while the radar operation is suspended, the wireless communication module 706 receives a third burst of SSBs in a half frame 902. Based on the SSBs received in the third burst of SSBs, the wireless communication module 706 obtains (for example, by generating) a third set of signal quality measurement quantities and identifies new first candidate time slots (radar$_{SSB}$). The new first candidate time slots (radar$_{SSB}$) are the updated radar$_{SSB}$. The procedure performed at block 1220 can be a repeat of block 1202 or can be the same as or similar to the procedures of blocks 1108-1110 of FIG. 11. The wireless communication module 706 indicates the updated radar$_{SSB}$ to the radar module 704, for example, by sending updated radar$_{SSB}$ information 1222 to the radar module 704.

In response to receiving the updated radar$_{SSB}$ information 1222, the radar module 704 reactivates and sends a radar active message 1224 to inform the wireless communication module 706 that the radar module is active. At block 1226, the radar module 704 commences to perform radar operations during the updated first candidate time slots that were indicated in the updated radar$_{SSB}$ information 1222.

At block 1228, the wireless communication module 706 continues to perform wireless communication operations during the SSB time slots that are not the radar$_{SSB}$. Particularly, the wireless communication module 706 continues to perform 5G NR measurement on the SSBs that are not correlated to (or received in) the updated first candidate time slots.

Although FIG. 12 illustrates an example of a coordination protocol 1200 between a wireless communication module and a radar module, various changes may be made to FIG. 12. For example, the wireless communication module 706 and the radar module 704 can be positioned on a common printed circuit board (PCB) or on different PCBs. As another example, the wireless communication module 706 and the radar module 704 can be manufactured by a common manufacturer by different manufacturers.

Figure 13:
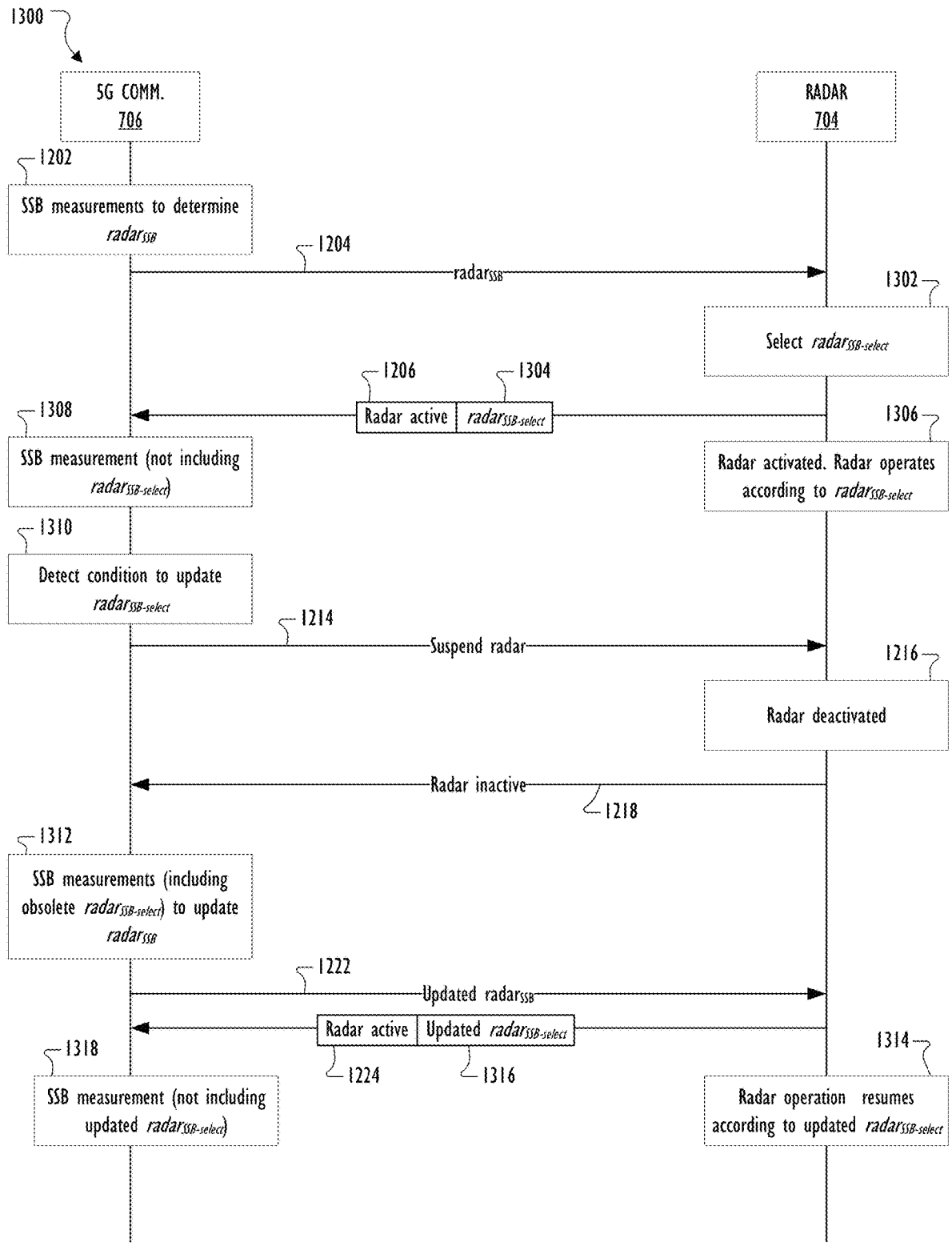
FIG. 13 illustrates a coordination protocol between a wireless communication module and a radar module that implement the processes of identifying and updating radar-selected candidate time slots for radar operation in accordance with an embodiment of this disclosure.

FIG. 13 illustrates a process 1300 for coordination between a wireless communication module 706 and a radar module 704 that implement the processes of identifying and updating radar-selected candidate time slots (radar$_{SSB\text{-}select}$) for radar operation in accordance with an embodiment of this disclosure. The embodiment of the process 1300 shown in FIG. 13 is for illustration only, and other embodiments could be used without departing from the scope of this disclosure. To avoid duplicative descriptions, some of the features (e.g., blocks 1202, 1204, 1206, 1214, 1216, 1218, 1222, and 1224) of the coordination protocol 1200 of FIG. 12 are also included in the process 1300 of FIG. 13.

At block 1302, from among the first candidate time slots (radar$_{SSB}$) which are identified by the wireless communication module 706, the radar module 704 selectively identifies a third set of candidate time slots (radar$_{SSB\text{-}select}$) that satisfy an operational condition for radar operations. The procedure for selectively identifying the third set of radar-selected candidate time slots (radar$_{SSB\text{-}select}$) can be referred to as down-selecting because the third set of radar-selected candidate time slots (radar$_{SSB\text{-}select}$) is a subset of the set of first candidate time slots (radar$_{SSB}$). Also, the down-selecting of block 1302 can be also referred to as radar$_{SSB\text{-}select}$ determination procedure 1302. In certain embodiments, the radar module 704 identifies or reclassifies the remainder of the first candidate time slots, which do not satisfy the operational condition for the radar operation, as monitored time slots. In certain embodiments, the operational condition for radar operations is based on a requirement of a radar application (for example, applications 262).

As a technical advantage, the radar module 704 indicates its down-selection decision to the wireless communication module 706 (radar$_{SSB\text{-}select}$) by sending radar$_{SSB\text{-}select}$ information 1304, so that the wireless communication module 706 can also perform measurement on the SSBs that are included in radar$_{SSB}$ but not in radar$_{SSB\text{-}select}$. In certain embodiments, the radar module 704 activates in response to receiving the radar$_{SSB}$ information 1204, and sends the radar active message 1206 with the radar$_{SSB\text{-}select}$ information 1304 to the wireless communication module 706 to indicate that radar module 704 is performing radar operations during the time slots indicated by the radar$_{SSB\text{-}select}$ information 1304.

At block 1306, the radar module 704 is activated and performs radar operations during the radar-selected candidate time slots (radar$_{SSB\text{-}select}$). At block 1308, the wireless communication module 706 continues to perform wireless communication operations during the SSB time slots that are not the radar-selected candidate time slots (radar$_{SSB\text{-}select}$) Particularly, the wireless communication module 706 resumes 5G NR measurement on the SSBs that are correlated to the first candidate time slots (radar$_{SSB}$) but not correlated to the radar-selected candidate time slots (radar$_{SSB\text{-}select}$)

At block 1310, the wireless communication module 706 detects that an update-triggering condition to update radar$_{SSB\text{-}select}$ is satisfied and sends a suspend radar message 1214 to the radar module 704 for suspending the radar operations. The radar$_{SSB\text{-}select}$ is considered obsolete based on the update-triggering condition to update radar$_{SSB\text{-}select}$ being satisfied.

At block 1312, in order to identify new radar$_{SSB\text{-}select}$, the wireless communication module 706 performs SSB measurement including obtaining signal quality measurement quantities for SSBs received during the obsolete radar-selected candidate time slots, and identifies new first candidate time slots (radar$_{SSB}$). The procedure performed at block 1312 can be the same as or similar to the procedure of block 1220 of FIG. 12.

At block 1314, in response to receiving the updated radar$_{SSB}$ information 1222, the radar module 704 reactivates, sends a radar active message 1224, and identifies new radar-selected candidate time slots as the updated radar$_{SSB\text{-}select}$. The procedure performed at block 1314 can be a repeat of the procedure of block 1302. In certain embodiments, the radar module 704 sends the radar active message 1224 with the updated radar$_{SSB\text{-}select}$ information 1316 to the wireless communication module 706 to indicate that radar module 704 is performing radar operations during the time slots indicated by the updated radar$_{SSB\text{-}select}$ information 1316.

At block 1318, the wireless communication module 706 continues to perform wireless communication operations during the SSB time slots that are not the radar$_{SSB}$, and in response to receiving the updated radar$_{SSB\text{-}select}$ information 1316, resumes wireless communication operations during the SSB time slots that are not correlated to the radar-selected candidate time slots (radar$_{SSB\text{-}select}$) The procedure performed at block 1318 can be a repeat of the procedure of block 1308.

Figure 14:
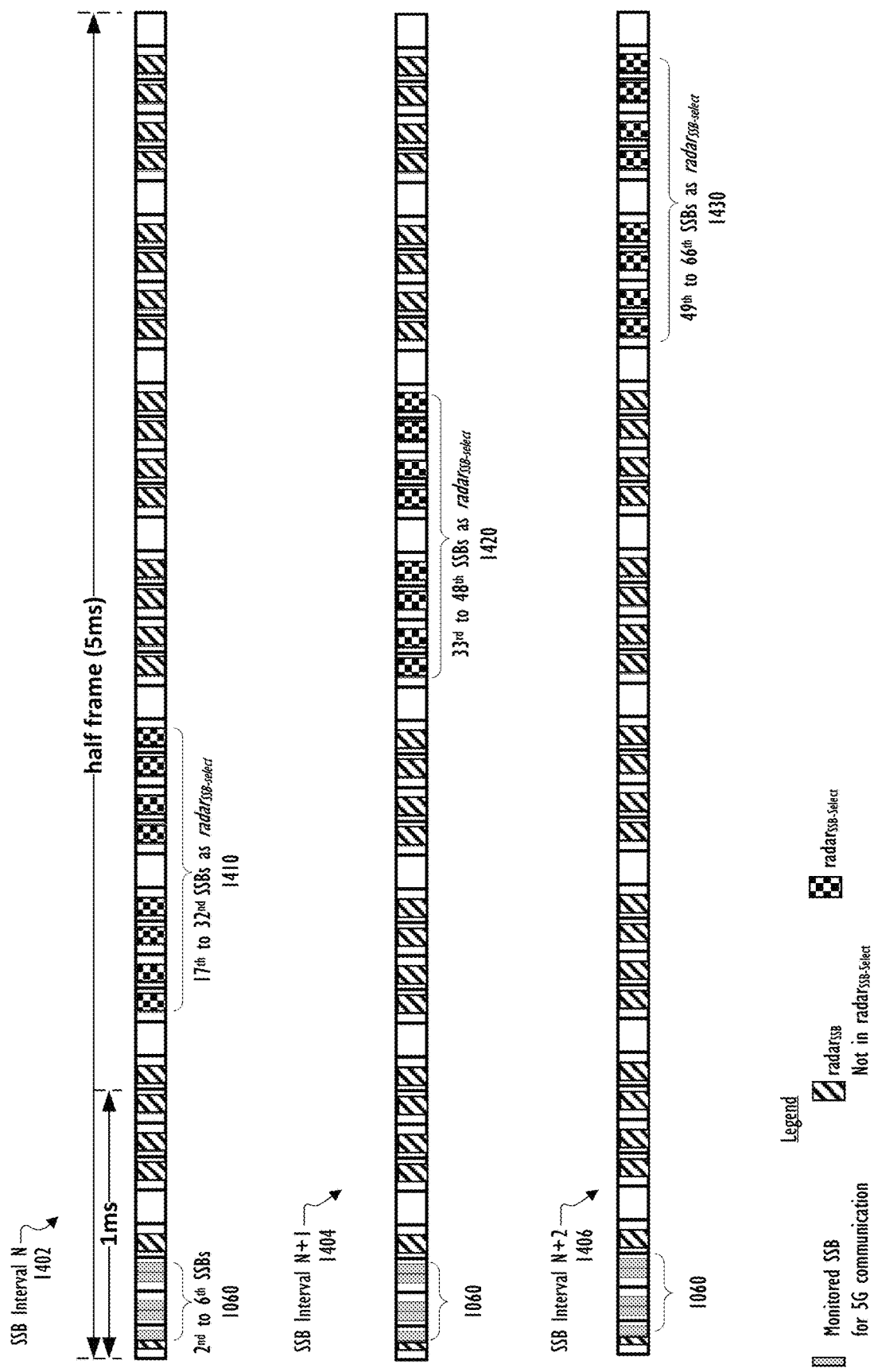
FIG. 14 illustrates candidate time slots for radar operation identified as a result of executing a process for selecting SSB time slots as radar-selected candidate time slots for radar operation of FIG. 13 in accordance with an embodiment of this disclosure.

FIG. 14 illustrates candidate time slots for radar operation identified as a result of executing a process 1300 for selecting SSB time slots as radar-selected candidate time slots for radar operation of FIG. 13 in accordance with an embodiment of this disclosure. More particularly, FIG. 14 illustrates three example results 1402, 1404, and 1406 of executing the process 1300 of FIG. 13 for three SSB Intervals N, N+1, and N+2, respectively. The embodiment of the results 1402, 1404, and 1406 shown in FIG. 14 is for illustration only, and other embodiments could be used without departing from the scope of this disclosure.

For ease of explanation, FIG. 14 includes a reproduction of the time-domain mapping of SSB time slots 904 for SSB SCS of 120 kHz within the half frame of FIG. 9. Also, the example results 1402, 1404, and 1406 in FIG. 14 include some of the features from FIG. 10B, including: the first candidate time slots include the radar$_{SSB}$ correlated to a first set of SSBs {SSB$_1$ and SSB$_7$ through SSB$_{64}$} that are not suitable for continuous measurement; and the second set of candidate time slots include the monitored time slots 1060 (Monitored$_{SSB}$) correlated to the second set of SSBs (SSB$_2$-SSB$_6$) that satisfy criterion for continuous measurement.

Now referring to a particular example for a first SSB Interval N, the result 1402 includes the identifying (for example, at block 1302) of a third set of candidate time slots 1410 (radar$_{SSB\text{-}select}$) that satisfy an operational condition for radar operations. That is, the radar-selected candidate time slots 1410 correlated to a third set of SSBs {SSB$_{17}$-SSB$_{32}$} are identified as radar$_{SSB\text{-}select}$ in the result 1402. Sometimes, the radar module 704 identifies a fewer number of radar-selected candidate time slots (radar$_{SSB\text{-}select}$) than are available in the set of first candidate time slots (radar$_{SSB}$), such as identifying 16 radar$_{SSB\text{-}select}$ from 59 radar$_{SSB}$ available. As a technical advantage, the wireless communication module 706 can perform monitoring (for example, at block 1308) not only during the monitored time slots 1060, but also perform monitoring the remainder SSBs {SSB$_1$, SSB$_7$-SSB$_{16}$, and SSB$_{33}$-SSB$_{64}$} that are not correlated to the radar-selected candidate time slots 1410.

The third set of SSBs {SSB$_{17}$-SSB$_{32}$}, which are correlated to radar-selected candidate time slots (radar$_{SSB\text{-}select}$), may not be measured by the wireless communication module 706 until an update-triggering condition to update radar$_{SSB\text{-}select}$ is satisfied. If a long time passes between a time at which the radar-selected candidate time slots 1410 are identified and a time at which an update-triggering condition is satisfied, then the third set of SSBs {SSB$_{17}$-SSB$_{32}$} will not be measured as frequently as the remainder SSBs {SSB$_1$, SSB$_7$-SSB$_{16}$, and SSB$_{33}$-SSB$_{64}$} which are reclassified as monitored SSBs. As a technical solution, the wireless communication module 706 and radar module 704 can coordinate such that the N SSBs within a half frame 902 are monitored or measured by the wireless communication module 706 for an approximately equal amount of time or as frequently as each other. For example, the wireless communication module 706 and radar module 704 can coordinate or agree on a round-robin rotation of SSB time slots used for radar operations, which provides the wireless communication module 706 windows of time as opportunities to update the SSB measurements for SSB beams within the first candidate time slots (radar$_{SSB}$). The round-robin rotation prevents a prolonged time period of no SSB measurements for SSB beams belonging to radar$_{SSB}$ or radar$_{SSB-select}$. To implement the round-robin rotation, the wireless communication module 706 and radar module 704 can coordinate the following: the radar-selected candidate time slots (radar$_{SSB-select}$) includes a number K of SSB time periods, which collectively define duration of an SSB time interval; updating the radar-selected candidate time slots (radar$_{SSB-select}$) by selecting K subsequent SSB time periods in a cyclical manner, such as the manner of time shifting the radar$_{SSB-select}$ to different portions of the half frame 902; and the update-triggering condition includes expiry of the SSB time interval after the set of radar-selected candidate time slots (radar$_{SSB-select}$) is determined or updated. By performing this round-robin update procedure, the measurements of the SSB within each radar$_{SSB}$ can still be updated though the update may occur every K SSB periods (i.e., every SSB time interval) rather than occurring as frequently as updating those SSB beams not belonging to radar$_{SSB}$.

When an update triggering condition to update radar$_{SSB-select}$ is satisfied (for example, at block 1310), the electronic device 200 can generate the result 1404 corresponding to a second SSB Interval N+1. In the case of a round-robin update from the first SSB Interval N to the second SSB Interval N+1, radar module 704 identifies (for example, at block 1314) of a set of radar-selected candidate time slots 1420 (radar$_{SSB-select}$) by time-shifting the K=16 SSB time slots from the time slots 1410 to the time slots 1420. That is, the updated radar-selected candidate time slots 1420 correlated to SSB$_{33}$-SSB$_{48}$ are identified as radar$_{SSB-select}$ in the result 1404. In the case of repeating the round-robin update from the second SSB Interval N to the third SSB Interval N+2, radar module 704 identifies a set of radar-selected candidate time slots 1420 (radar$_{SSB-select}$) by time-shifting the K=16 SSB time slots from the time slots 1420 to the updated radar-selected candidate time slots 1430 correlated to SSB$_{49}$-SSB$_{66}$ and identified as radar$_{SSB-select}$ in the result 1406. Analogously, a consecutive SSB Interval N+3 includes a cyclical shift such that radar module 704 updates the set of radar-selected candidate time slots (radar$_{SSB-select}$) to be correlated to {SSB$_1$, SSB$_7$-SSB$_{16}$}.

Although FIG. 14 illustrates example results 1402-1406 of executing a process 1300 for selecting and updating SSB time slots as radar$_{SSB-select}$ according to a round-robin rotation, various changes may be made to FIG. 14. As a particular example, in a different half frame, the monitored time slots 1060 (Monitored$_{SSB}$) that satisfy criterion for continuous measurement can be updated and may change to correlate to a different set of SSBs (other than SSB$_2$-SSB$_6$).

In certain embodiments, for a certain type of electronic device 200 and operation conditions, the electronic device 200 may choose to monitor only some of the SSB periods for the purpose of wireless communication, and skip monitoring some other SSB periods in a periodic manner. For example, in a UE beam management procedure that utilizes sensors 265 on the electronic device 200 to help predict the beam change, it could be sufficient to monitor the SSB every two or three SSB periods, which is referred to as a sporadic SSB measurement condition. Under such state of the sporadic SSB monitoring condition, the radar module 704 operates during the SSB time slots for those SSB periods that the electronic device does not monitor and/or measure the SSB.

In certain embodiments, the allowed size of radar$_{SSB}$, radar$_{SSB-select}$, and the frequency for round-robin measurements can be determined based on the device speed, which may be determined from one or more on-board sensors, such as accelerometer or gyroscope. With sufficiently high speed, the size of radar$_{SSB-select}$, (e.g., number K of time slots selected as radar$_{SSB-select}$) may be set such that SSB beams belonging to radar$_{SSB}$ can be measured every other SSB period. For example, it may be set that in a high speed, the number of slots in radar$_{SSB-select}$ must be below half of the number of slots in radar$_{SSB}$ (thus, the round-robin of period 2 can cover all beams in radar$_{SSB}$).

In certain embodiments, all available SSB time slots and other time slots can be made available or allocated to radar operation when the 5G antenna module 702b that is affected by the radar activity or can affect the radar activity is not active or in sleeping mode. This can be because another 5G antenna module 702b on the device 200 is currently the active or serving module, and does not affect or is not affected by the radar operation due to sufficiently good RF isolation. To facilitate this embodiment, the state of the 5G antenna module 702b (active or inactive) can be additionally conveyed to the radar module 704 in the coordination procedure 1200 and/or 1300 of FIGS. 12 and 13, respectively.

In certain embodiments, if the non-serving 5G antenna module 702b is only performing 5G measurement based on SSB (every SSB interval, every n SSB intervals, or intermittently in general), and not performing 5G data communication via the non-serving 5G module 706, the radar module 704 can be utilized for radar operations during time slots outside of the SSB slots, and/or outside of the radar$_{SSB}$ and/or outside of radar$_{SSB-select}$ slots as described in this disclosure. In this embodiment, the state of whether the 5G antenna module 702b is non-serving and is measuring SSBs can also be conveyed to the radar module 704 in the coordination procedure 1200 and/or 1300 of FIGS. 12 and 13, respectively.

Figure 15A:
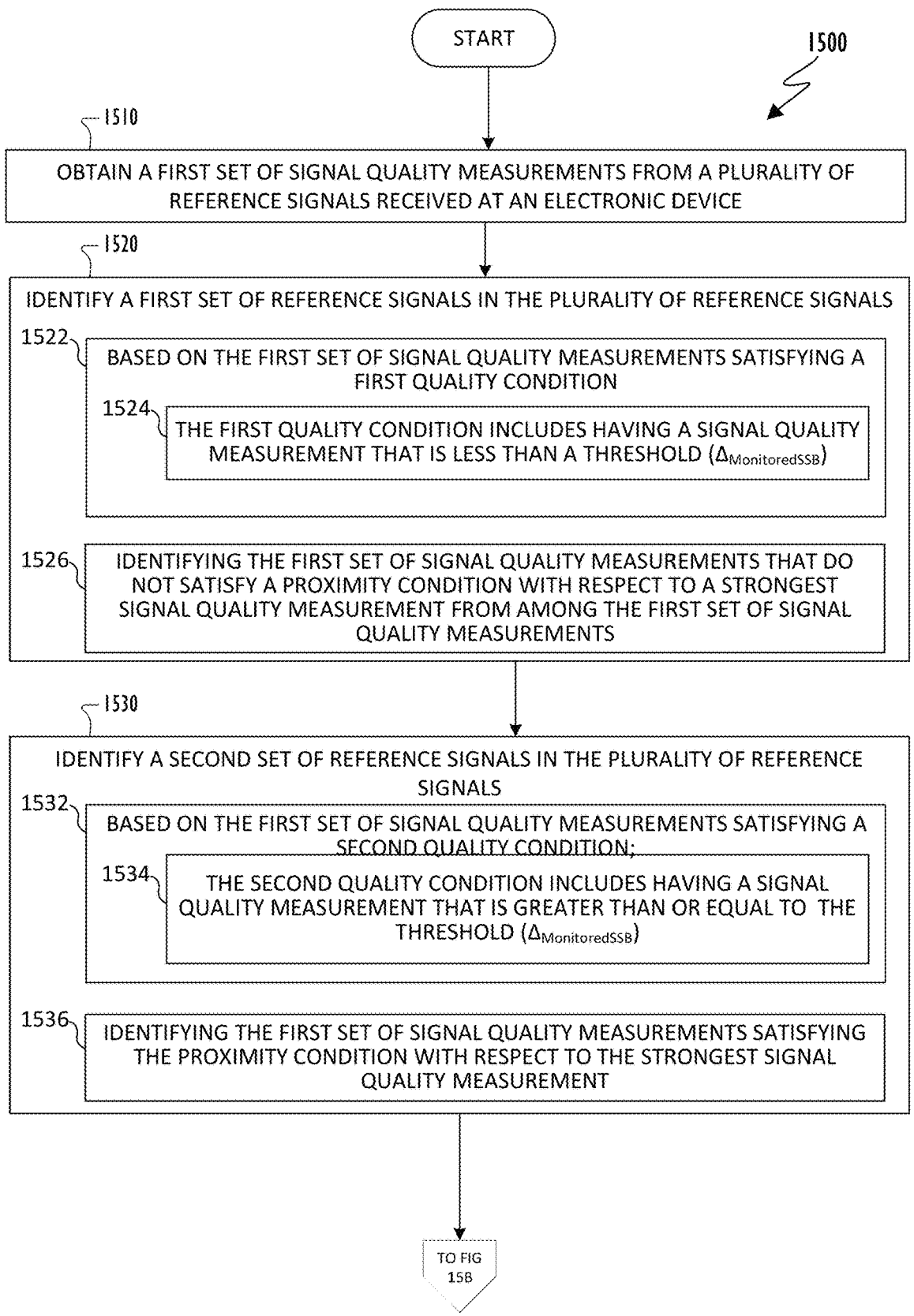
FIGS. 15A and 15B illustrate a process for utilization of wireless communication reference signal measurement resources for co-channel radar operation in accordance with an embodiment of this disclosure.
Figure 15B:
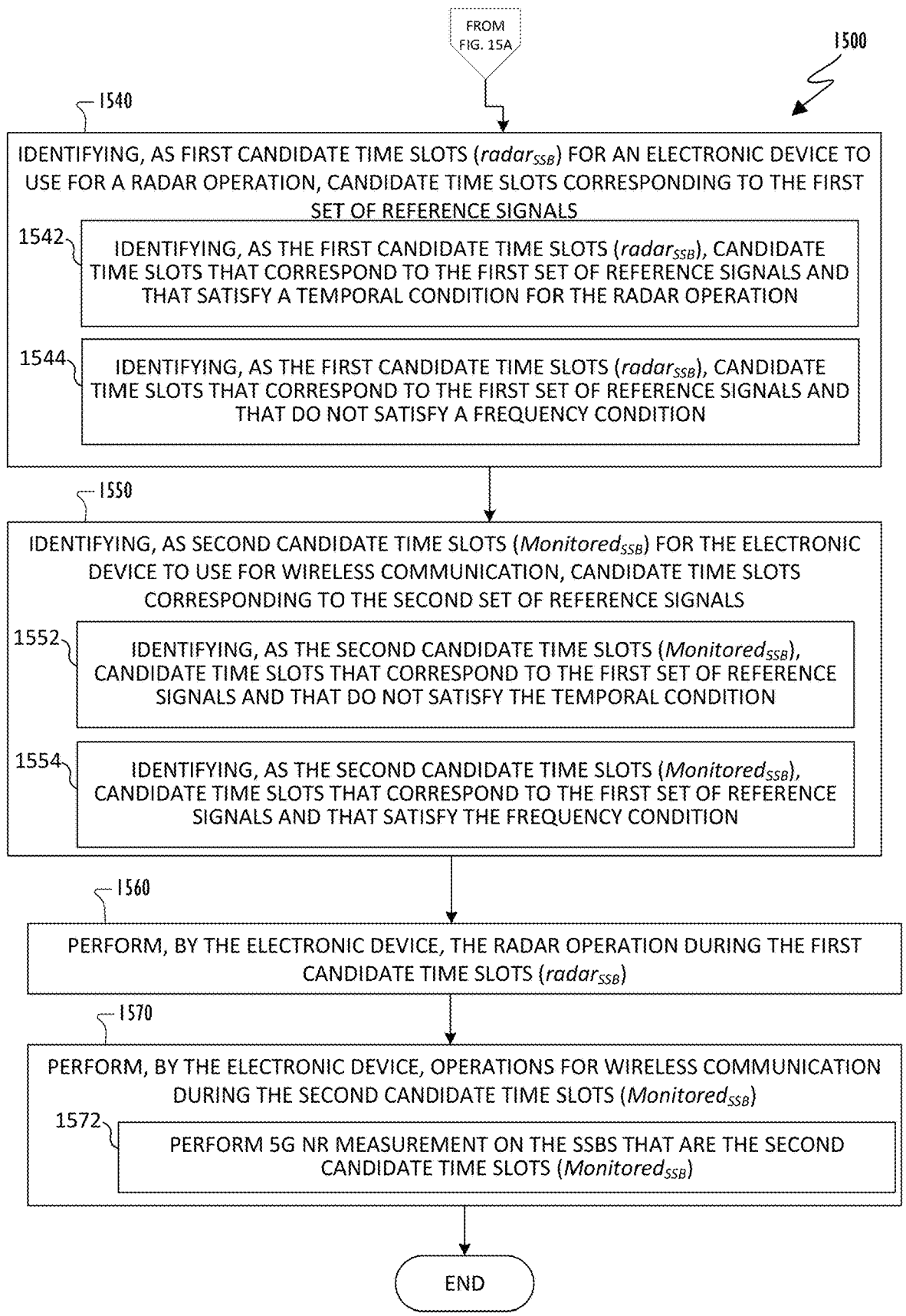

FIGS. 15A and 15B illustrate a process 1500 for utilization of wireless communication reference signal measurement resources for co-channel radar operation in accordance with an embodiment of this disclosure. The embodiment of the process 1500 shown in FIG. 15 is for illustration only, and other embodiments could be used without departing from the scope of this disclosure. The process 1500 is implemented by an electronic device 200 that includes the radar module 704 and the wireless communication module 706. More particularly, the process 1500 could be and is described as being performed by a processor 240 of the electronic device 200.

Referring to FIG. 15A, at block 1510, the processor 240 obtains a first set of signal quality measurements from a plurality of reference signals (SSBs) received at an electronic device 200. The signal quality measurements correspond to the reference signals, respectively. The reference signals correspond to candidate time slots (e.g., SSB time slots 904), respectively.

At block 1520, a first set of reference signals in the plurality of reference signals is identified. More particularly, at block 1522, the processor 240 identifies the first set of reference signals in the plurality of reference signals based on the first set of signal quality measurements satisfying a first quality condition. In certain embodiments, as shown at block 1524, the first quality condition includes having a signal quality measurement that is less than a threshold ($\Delta_{MonitoredSSB}$). In certain embodiments, as shown at block 1526, identifying a first set of reference signals in the plurality of reference signals includes identifying the first set of signal quality measurements that do not satisfy a proximity condition with respect to a strongest signal quality measurement from among the first set of signal quality measurements. The strongest signal quality measurement can be a largest reference signal received power (SS-RSRP) from among the SS-RSRPs measured from the N SSBs in a half frame 902, a largest reference signal received quality (RSRQ) from among the RSRQs measured from the N SSBs, or a largest signal-to-interference and noise ratio (SINR) from among the SINRs measured from the N SSBs. In certain embodiments, identifying a first set of reference signals includes identifying a specified number M of reference signals to be included in the first set of reference signals. The specified number M, as a limit on how many SSB time slots can be allocated for radar operations, can be determined based on a threshold ($\Delta_{MonitoredSSB}$) or a specified number ($\varphi$) of decibels relative to a jth strongest signal quality measurement of the plurality of reference signals.

At block 1530, a second set of reference signals in the plurality of reference signals is identified. More particularly, as shown at block 1532, the processor 240 identifies the second set of reference signals in the plurality of reference signals based on the first set of signal quality measurements satisfying a second quality condition. In certain embodiments, as shown at block 1534, the second quality condition includes having a signal quality measurement that is greater than or equal to the threshold ($\Delta_{MonitoredSSB}$). In certain embodiments, as shown at block 1536, identifying the second set of reference signals in the plurality of reference signals includes identifying the first set of signal quality measurements that satisfy the proximity condition with respect to the jth strongest signal quality measurement.

Now referring to FIG. 15B, block 1540 includes sub-process blocks 1542 and 1544, which may respectively cooperate with block 1560 that includes sub-process blocks 1552 and 1554, as described below. At block 1540, the processor 240 identifies, as first candidate time slots (radar$_{SSB}$) for an electronic device 200 to use for a radar operation, candidate time slots (e.g., SSB time slots 904) corresponding to the first set of reference signals. In certain embodiments, as shown in block 1542, identifying, as the first candidate time slots (radar$_{SSB}$), candidate time slots that correspond to the first set of reference signals and that satisfy a temporal condition for the radar operation.

In certain embodiments, as shown in block 1544, identifying, as the first candidate time slots (radar$_{SSB}$), candidate time slots that correspond to the first set of reference signals and that do not satisfy a frequency condition (for example, an RF isolation condition). Additional SSB time slots can be allocated to radar operation when the electronic device 200 performs inter-frequency SSB measurement at a frequency or at frequencies with sufficient distance from the radar operating frequency such that an RF isolation condition is satisfied. In that case, the wireless communication module 706 can indicate to the radar module 704 the schedule of such inter-frequency SSB measurement, so that the radar module 704 can also utilize the additional SSB time slots for radar operation. More particularly, the processor 240 can determine that the electronic device is measuring SSBs in a frequency far enough away from the radar operating frequency such that the RF isolation condition is satisfied (e.g., high RF isolation is achieved), and in response to the determination, control the electronic device 200 to use SSB time slots for radar operation. Alternatively, the processor 240 can determine that the electronic device 200 is not measuring SSBs in a frequency far enough away from the radar operating frequency such that the RF isolation condition is not satisfied (e.g., insufficient RF isolation), and in response to the determination, control the electronic device 200 to use the radar$_{SSB}$ determination procedure 1000 and/or radar$_{SSB-select}$ determination procedure 1302.

At block 1550, the processor 240 identifies, as second candidate time slots (Monitored$_{SSB}$) for the electronic device to use for wireless communication, candidate time slots corresponding to the second set of reference signals. In block 1552, identifying, as the second candidate time slots (Monitored$_{SSB}$), candidate time slots that correspond to the first set of reference signals and that do not satisfy the temporal condition. In certain embodiments, as shown in block 1544, identifying, as the second candidate time slots (Monitored$_{SSB}$), candidate time slots that correspond to the first set of reference signals and that satisfy the frequency condition.

At block 1560, the processor 240 controls the electronic device 200 to perform the radar operation during the first candidate time slots (radar$_{SSB}$). For example, the processor 240 controls the radar module 704 to perform the radar operation.

At block 1570, the processor 240 controls the electronic device to perform the operations for wireless communication during the second candidate time slots (MonitoredSSB). For example, as shown in block 1572, the processor 240 controls the wireless communication module 706 to perform 5G NR SSB measurement and monitoring on the SSBs that are the second candidate time slots (Monitored$_{SSB}$).

Although FIG. 15 illustrates an example process 1500 for utilization of wireless communication reference signal measurement resources for co-channel radar operation, various changes may be made to FIG. 15. For example, while shown as a series of steps, various steps in FIG. 15 could overlap, occur in parallel, occur in a different order, or occur any number of times.

Figure 16:
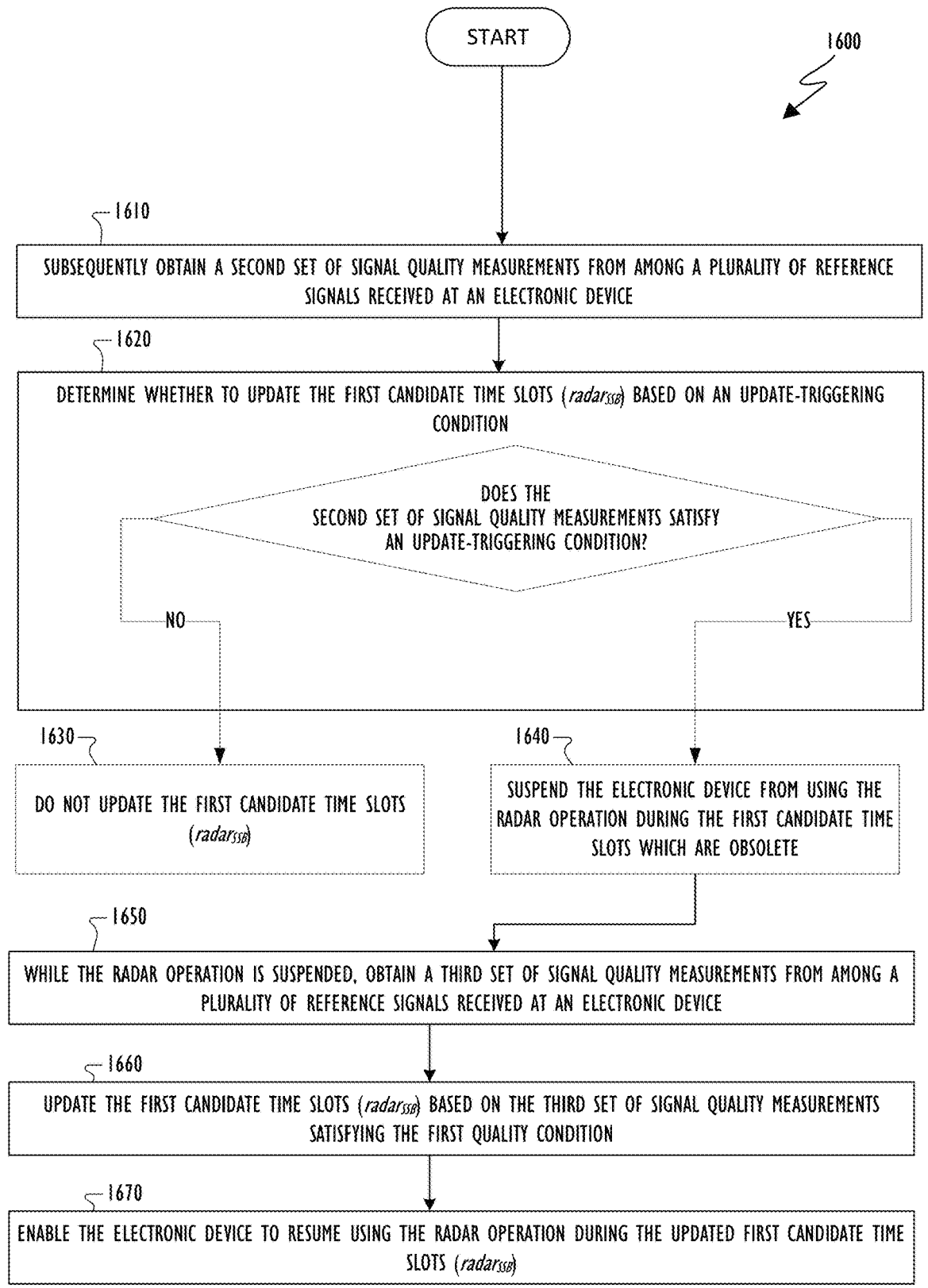
FIG. 16 illustrates a process for updating candidate time slots for radar operation in accordance with an embodiment of this disclosure.

FIG. 16 illustrates a process 1600 for updating candidate time slots for radar operation in accordance with an embodiment of this disclosure. The embodiment of the process 1600 shown in FIG. 16 is for illustration only, and other embodiments could be used without departing from the scope of this disclosure. Also, wireless communication module 706 and radar module 704 can implement the process 1600 as part of the coordination procedure 1200 of FIG. 12.

At block 1610, the processor 240 subsequently obtains a second set of signal quality measurements from among a plurality of reference signals (SSBs) received at an electronic device 200. For example, the plurality of reference signals can include a first burst of SSBs (for example in SSB Interval N) that are measured to generate a (previously obtained) first set of signal quality measurements. Also, the plurality of reference signals can include a second burst of SSBs (for example in SSB Interval N+1) that are measured to generate the second set of signal quality measurements. The procedure at block 1602 is similar to the procedure of block 1208.

At block 1620, the processor 240 determines whether to update the first candidate time slots (radar$_{SSB}$) based on an update-triggering condition. For example, the processor 240 may determine whether the subsequently obtained second set of signal quality measurements satisfy the update-triggering condition. In response to a determination to not update the radar$_{SSB}$, the process 1600 proceeds to block 1630, at which the existing first candidate time slots are not updated.

At block 1640, which is similar to the procedure of block 1216, the processor 240 suspends the electronic device from using the radar operation during the first candidate time slots which are obsolete. Blocks 1650 and 1660 are similar to the procedure of block 1220. At block 1650, while the radar operation is suspended, the processor 240 obtains a third set of signal quality measurements from among a plurality of reference signals received at an electronic device. For example, the plurality of reference signals can include a third burst of SSBs that are measured to generate the third set of signal quality measurements. At block 1660, the processor 240 updates the first candidate time slots (radar$_{SSB}$) based on the third set of signal quality measurements satisfying the first quality condition. At block 1670, which is similar to block 1226, the processor 240 enables the electronic device 200 to resume using the radar operation during the updated first candidate time slots (radar$_{SSB}$).

Although FIG. 16 illustrates an example of a process 1600 for updating candidate time slots for radar operation, various changes may be made to FIG. 16. For example, while shown as a series of steps, various steps in FIG. 16 could overlap, occur in parallel, occur in a different order, or occur any number of times.

Figure 17:
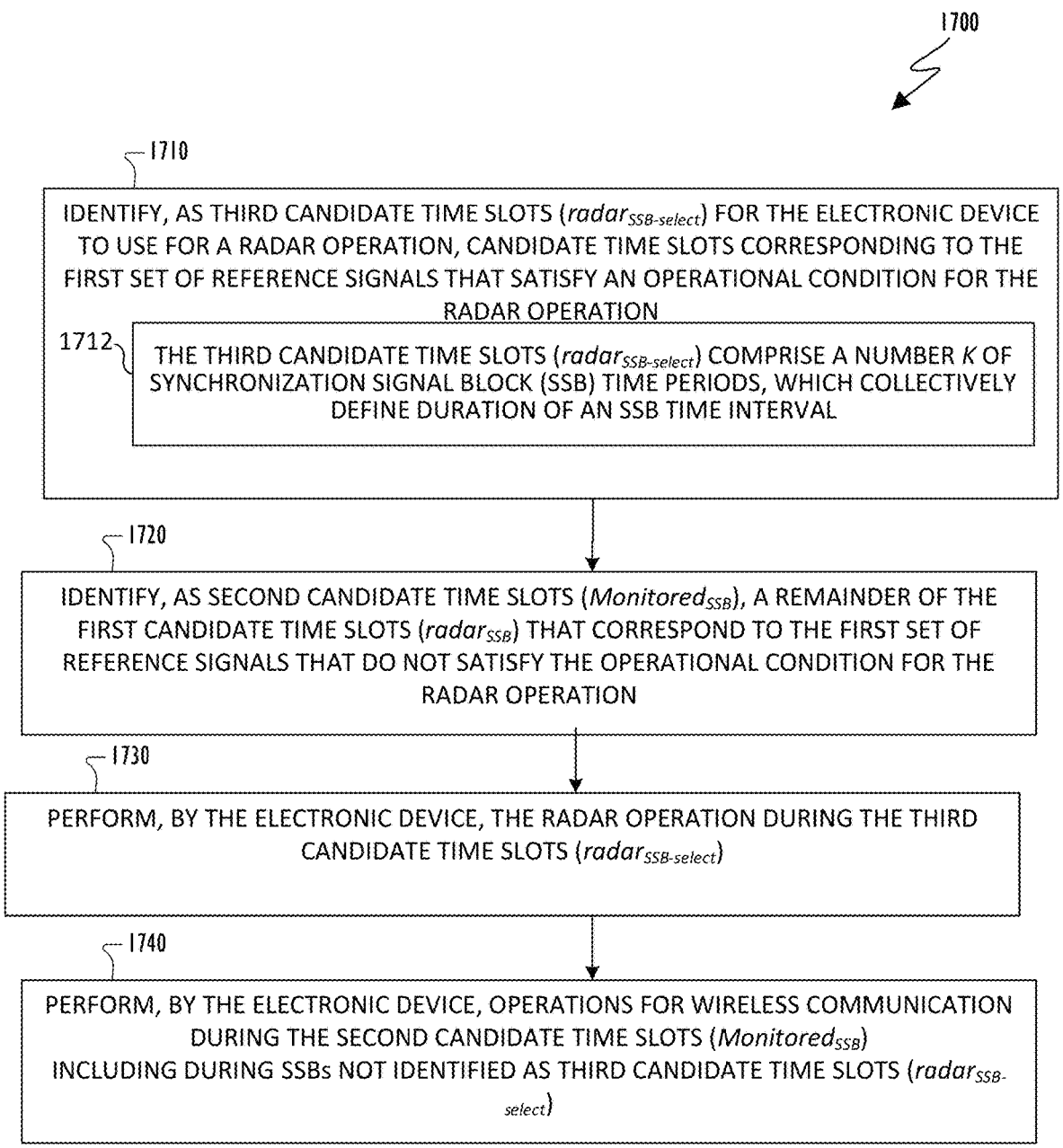
FIG. 17 illustrates a process for selecting SSB time slots as radar-selected candidate time slots for radar operation in accordance with an embodiment of this disclosure.

FIG. 17 illustrates a process 1700 for selecting SSB time slots as radar-selected candidate time slots for radar operation in accordance with an embodiment of this disclosure. The embodiment of the process 1700 shown in FIG. 17 is for illustration only, and other embodiments could be used without departing from the scope of this disclosure. Also, wireless communication module 706 and radar module 704 can implement the process 1600 as part of the process 1300 of FIG. 13. For example, blocks 1710, 1730, and 1740 of the process 1700 correspond to blocks 1302, 1306, and 1308 the process 1300 of the FIG. 13, respectively.

At block 1710, the processor 240 identifies, as third candidate time slots (radar$_{SSB-select}$) for the electronic device 200 to use for a radar operation, candidate time slots corresponding to the first set of reference signals that satisfy an operational condition for the radar operation. In certain embodiments, the third candidate time slots (radar$_{SSB-select}$) comprise K SSB time periods, which collectively define duration of an SSB time interval.

At block 1720, the processor 240 identifies, as second candidate time slots (Monitored$_{SSB}$), a remainder of the first candidate time slots (radar$_{SSB}$) that correspond to the first set of reference signals that do not satisfy the operational condition for the radar operation. At block 1730, the processor 240 controls the electronic device 200 to performs the radar operation during the third candidate time slots (radar$_{SSB-select}$).

At block 1740, the processor 240 controls the electronic device 200 to perform operations for wireless communication during the second candidate time slots (MonitoredSSB) including during SSBs not identified as third candidate time slots (radar$_{SSB-select}$).

Although FIG. 17 illustrates an example of a process 1700 for selecting SSB time slots as radar-selected candidate time slots for radar operation, various changes may be made to FIG. 17. For example, while shown as a series of steps, various steps in FIG. 17 could overlap, occur in parallel, occur in a different order, or occur any number of times.

Figure 18:
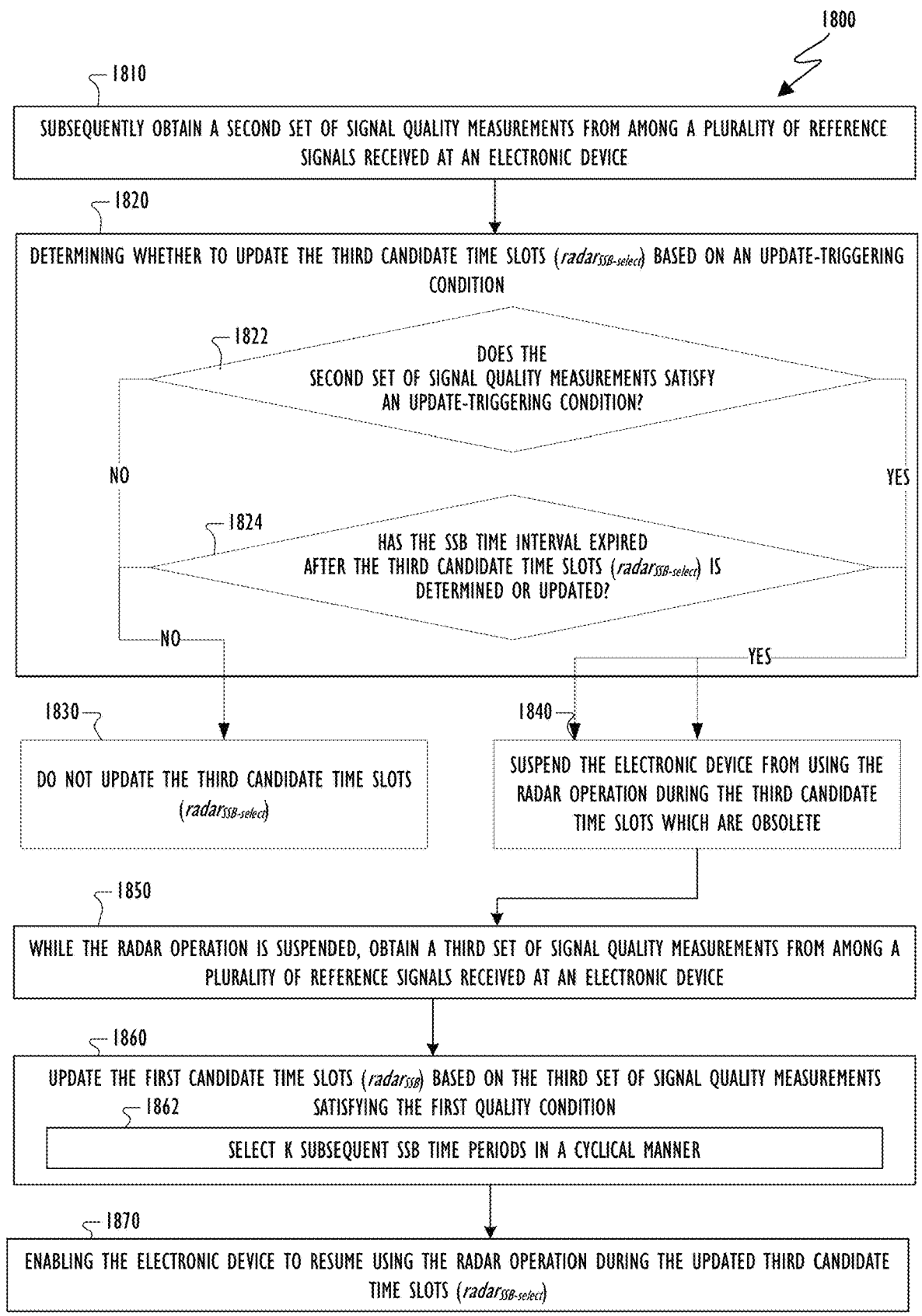
FIG. 18 illustrates a process for updating radar-selected candidate time slots for radar operation in accordance with an embodiment of this disclosure.

FIG. 18 illustrates a process 1800 for updating radar-selected candidate time slots for radar operation in accordance with an embodiment of this disclosure. The embodiment of the process 1800 shown in FIG. 18 is for illustration only, and other embodiments could be used without departing from the scope of this disclosure. Also, wireless communication module 706 and radar module 704 can implement the process 1800 as part of the process 1300 of FIG. 13. Also, blocks 1810-1870 of the process 1800 is similar to the corresponding blocks 1610-1670 of the process 1600 of FIG. 16, and to avoid duplicative descriptions, only differences are described below.

At block 1820, the processor 240 determines whether to update the third candidate time slots (radar$_{SSB-select}$) based on an update-triggering condition. The update-triggering conditions for radar$_{SSB-select}$ can be the same as or different from the update-triggering conditions for radar$_{SSB}$. For example, as shown at block 1824 to determine whether to update the third candidate time slots, the processor 240 may start a timer at a time when the third candidate time slots (radar$_{SSB-select}$) are determined or updated, and determine whether the SSB time interval has expired since the time started. At block 1862, to update the first candidate time slots based on the third set of signal quality measurements satisfying the first quality condition, the processor 240 selects K subsequent SSB time periods in a cyclical manner. At block 1870, which is similar to block 1314, the processor 240 enables the electronic device 200 to resume using the radar operation during the updated third candidate time slots (radar$_{SSB-select}$).

Although FIG. 18 illustrates an example process 1800 for updating radar-selected candidate time slots for radar operation, various changes may be made to FIG. 18. For example, while shown as a series of steps, various steps in FIG. 18 could overlap, occur in parallel, occur in a different order, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
obtaining a first set of signal quality measurements, the signal quality measurements corresponding to reference signals, respectively, from among a plurality of reference signals received at an electronic device, the reference signals corresponding to candidate time slots, respectively;

identifying a first set of reference signals in the plurality of reference signals based on the first set of signal quality measurements satisfying a first quality condition;

identifying a second set of reference signals in the plurality of reference signals based on the first set of signal quality measurements satisfying a second quality condition;

identifying, as first candidate time slots for an electronic device to use for a radar operation, candidate time slots corresponding to the first set of reference signals;

identifying, as second candidate time slots for the electronic device to use for wireless communication, candidate time slots corresponding to the second set of reference signals; and controlling the electronic device to perform or suspend the radar operation based on the identified first candidate time slots.

2. The method of claim 1, wherein:
the reference signals corresponding to candidate time slots are reference signals corresponding to a Synchronization Signal Block (SSB) time period, respectively;
satisfying the first quality condition comprises having a signal quality measurement that is less than a threshold; and
satisfying the second quality condition comprises having a signal quality measurement that is greater than or equal to the threshold.

3. The method of claim 1, wherein:
identifying the first set of reference signals comprises identifying the first set of signal quality measurements that do not satisfy a proximity condition with respect to a strongest signal quality measurement from among the first set of signal quality measurements; and
identifying the second set of reference signals comprises identifying the first set of signal quality measurements satisfying the proximity condition with respect to the strongest signal quality measurement.

4. The method of claim 1, further comprising:
identifying, as the first candidate time slots, candidate time slots that correspond to the first set of reference signals and that satisfy a temporal condition for the radar operation; and
identifying, as the second candidate time slots, candidate time slots that correspond to the first set of reference signals and that do not satisfy the temporal condition.

5. The method of claim 1, further comprising:
identifying, as the first candidate time slots, candidate time slots that correspond to the first set of reference signals and that do not satisfy a frequency condition; and
identifying, as the second candidate time slots, candidate time slots that correspond to the first set of reference signals and that satisfy the frequency condition.

6. The method of claim 1, further comprising:
determining whether to update the first candidate time slots based on an update-triggering condition by, in response to determining a subsequently obtained second set of signal quality measurements satisfies the update-triggering condition, determining to update the first candidate time slots ($radar_{SSB}$); and
in response to the determination to update the first candidate time slots:
suspending the electronic device from using the radar operation during the first candidate time slots which are obsolete;
while the radar operation is suspended, obtaining a third set of signal quality measurements; and
updating the first candidate time slots by repeating the identifying of first candidate time slots based on the third set of signal quality measurements satisfying the first quality condition; and
enabling the electronic device to resume using the radar operation during the updated first candidate time slots.

7. The method of claim 1, further comprising:
identifying, as third candidate time slots for the electronic device to use for the radar operation, candidate time slots corresponding to the first set of reference signals that satisfy an operational condition for the radar operation, the third candidate time slots being a subset of the first candidate time slots; and
identifying, as second candidate time slots, a remainder of the first candidate time slots that correspond to the first set of reference signals that do not satisfy the operational condition for the radar operation.

8. The method of claim 7, further comprising:
determining whether to update the third candidate time slots based on an update-triggering condition by, in response to determining a subsequently obtained second set of signal quality measurements satisfies the update-triggering condition, determining to update the third candidate time slots; and
in response to the determination to update the third candidate time slots:
suspending the electronic device from using the radar operation during the third candidate time slots which are obsolete;
while the radar operation is suspended, obtaining a third set of signal quality measurements;
updating the first candidate time slots based on the third set of signal quality measurements satisfying the first quality condition; and
updating the third candidate time slots by identifying, from among the updated first candidate time slots, candidate time slots corresponding to updated first set of reference signals that satisfy the operational condition for the radar operation; and
enabling the electronic device to resume using the radar operation during the updated third candidate time slots.

9. The method of claim 8, wherein:
the third candidate time slots comprise a number K of Synchronization Signal Block (SSB) time periods, which collectively define duration of an SSB time interval;
updating the third candidate time slots comprises selecting K subsequent SSB time periods in a cyclical manner; and
the update-triggering condition includes expiry of the SSB time interval after the third candidate time slots is determined or updated.

10. An electronic device comprising:
a radar circuit configured for the electronic device to operate using radar operations;
a wireless communication circuit configured for the electronic device to operate using a wireless communication protocol different from the radar operations; and
a processor configured to:
obtain a first set of signal quality measurements, the signal quality measurements corresponding to reference signals, respectively, from among a plurality of reference signals received at the electronic device, the reference signals corresponding to candidate time slots, respectively;

identify a first set of reference signals in the plurality of reference signals based on the first set of signal quality measurements satisfying a first quality condition;

identify a second set of reference signals in the plurality of reference signals based on the first set of signal quality measurements satisfying a second quality condition;

identify, as first candidate time slots for the electronic device to use for a radar operation, candidate time slots corresponding to the first set of reference signals;

identify, as second candidate time slots for the electronic device to use for wireless communication, candidate time slots corresponding to the second set of reference signals; and control the radar circuit to perform or suspend the radar operation based on the identified first candidate time slots.

11. The electronic device of claim 10, wherein:

the reference signals corresponding to candidate time slots are reference signals corresponding to a Synchronization Signal Block (SSB) time period, respectively; and satisfying the first quality condition comprises having a signal quality measurement that is less than a threshold; and satisfying the second quality condition comprises having a signal quality measurement that is greater than or equal to the threshold.

12. The electronic device of claim 10, wherein the processor is further configured to:

identify the first set of reference signals by identifying the first set of signal quality measurements that do not satisfy a proximity condition with respect to a strongest signal quality measurement from among the first set of signal quality measurements; and identify the second set of reference signals by identifying the first set of signal quality measurements satisfying the proximity condition with respect to the strongest signal quality measurement.

13. The electronic device of claim 10, wherein the processor is further configured to:

identify, as the first candidate time slots, candidate time slots that correspond to the first set of reference signals and that satisfy a temporal condition for the radar operation; and identify, as the second candidate time slots, candidate time slots that correspond to the first set of reference signals and that do not satisfy the temporal condition.

14. The electronic device of claim 10, wherein the processor is further configured to:

identify, as the first candidate time slots, candidate time slots that correspond to the first set of reference signals and that do not satisfy a frequency condition; and identify, as the second candidate time slots, candidate time slots that correspond to the first set of reference signals and that satisfy the frequency condition.

15. The electronic device of claim 10, wherein the processor is further configured to:

determine whether to update the first candidate time slots based on an update-triggering condition by, in response to determining a subsequently obtained second set of signal quality measurements satisfies the update-triggering condition, determining to update the first candidate time slots ($radar_{SSB}$); and in response to the determination to update the first candidate time slots:

suspend the electronic device from using the radar operation during the first candidate time slots which are obsolete;

while the radar operation is suspended, obtain a third set of signal quality measurements; and update the first candidate time slots by repeating the identifying of first candidate time slots based on the third set of signal quality measurements satisfying the first quality condition; and enable the electronic device to resume using the radar operation during the updated first candidate time slots.

16. The electronic device of claim 10, wherein the processor is further configured to:

identify, as third candidate time slots for the electronic device to use for the radar operation, candidate time slots corresponding to the first set of reference signals that satisfy an operational condition for the radar operation, the third candidate time slots being a subset of the first candidate time slots; and identify, as second candidate time slots, a remainder of the first candidate time slots that correspond to the first set of reference signals that do not satisfy the operational condition for the radar operation.

17. The electronic device of claim 16, wherein the processor is further configured to:

determine whether to update the third candidate time slots based on an update-triggering condition by, in response to determining a subsequently obtained second set of signal quality measurements satisfies the update-triggering condition, determining to update the third candidate time slots; and in response to the determination to update the third candidate time slots:

suspend the electronic device from using the radar operation during the third candidate time slots which are obsolete;

while the radar operation is suspended, obtain a third set of signal quality measurements;

update the first candidate time slots based on the third set of signal quality measurements satisfying the first quality condition; and update the third candidate time slots by identifying, from among the updated first candidate time slots, candidate time slots corresponding to updated first set of reference signals that satisfy the operational condition for the radar operation; and enable the electronic device to resume using the radar operation during the updated third candidate time slots.

18. The electronic device of claim 17, wherein:

the third candidate time slots comprise a number K of Synchronization Signal Block (SSB) time periods, which collectively define duration of an SSB time interval;

the processor is further configured to update the third candidate time slots by selecting K subsequent SSB time periods in a cyclical manner; and the update-triggering condition includes expiry of the SSB time interval after the third candidate time slots is determined or updated.

19. A non-transitory computer readable medium embodying a computer program, the computer program comprising computer readable program code that when executed causes at least one processor to:

obtain a first set of signal quality measurements, the signal quality measurements corresponding to reference signals, respectively, from among a plurality of reference signals received at an electronic device, the reference signals corresponding to candidate time slots, respectively;

identify a first set of reference signals in the plurality of reference signals based on the first set of signal quality measurements satisfying a first quality condition;

identify a second set of reference signals in the plurality of reference signals based on the first set of signal quality measurements satisfying a second quality condition;

identify, as first candidate time slots for an electronic device to use for a radar operation, candidate time slots corresponding to the first set of reference signals;

identify, as second candidate time slots for the electronic device to use for wireless communication, candidate time slots corresponding to the second set of reference signals; and control the electronic device to perform or suspend the radar operation based on the identified first candidate time slots.

20. The non-transitory computer readable medium of claim 19, wherein:

the reference signals corresponding to candidate time slots are reference signals corresponding to a Synchronization Signal Block (SSB) time period, respectively;

satisfying the first quality condition comprises having a signal quality measurement that is less than a threshold; and satisfying the second quality condition comprises having a signal quality measurement that is greater than or equal to the threshold.

* * * * *